United States Patent
Hirayama et al.

(10) Patent No.: US 7,077,012 B2
(45) Date of Patent: Jul. 18, 2006

(54) WEDGE AND WEDGE UNIT FOR USE IN ULTRASONIC DOPPLER FLOW METER

(75) Inventors: Noritomo Hirayama, Hino (JP); Toshihiro Yamamoto, Iruma-si (JP); Hironobu Yao, Hino (JP); Takuya Onodera, Hino (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 0 days.

(21) Appl. No.: 11/042,356

(22) Filed: Jan. 25, 2005

(65) Prior Publication Data

US 2005/0166684 A1    Aug. 4, 2005

(30) Foreign Application Priority Data

Jan. 30, 2004 (JP) ............................. 2004-022584
Jun. 14, 2004 (JP) ............................. 2004-175100
Jun. 14, 2004 (JP) ............................. 2004-175101

(51) Int. Cl.
*G01F 1/66* (2006.01)

(52) U.S. Cl. .................................................. 73/861.25

(58) Field of Classification Search ............ 73/861.28, 73/861.25, 861.27

See application file for complete search history.

(56) References Cited

U.S. PATENT DOCUMENTS

| 4,004,461 A | * | 1/1977 | Lynnworth | ............... 73/861.27 |
| 4,373,401 A | * | 2/1983 | Baumoel | ................. 73/861.18 |
| 4,454,767 A |   | 6/1984 | Shinkai et al. | |
| 4,545,244 A | * | 10/1985 | Yasuda et al. | ................ 73/195 |
| 4,930,358 A |   | 6/1990 | Motegi et al. | |
| 5,131,278 A | * | 7/1992 | Baumoel | ................. 73/861.18 |
| 5,623,473 A | * | 4/1997 | Ichihara | ..................... 430/321 |
| 6,293,156 B1 | * | 9/2001 | Shen et al. | ............. 73/861.26 |
| 2002/0100335 A1 |   | 8/2002 | Koyano et al. | |

FOREIGN PATENT DOCUMENTS

| JP | 2000-097742 | 4/2000 |
| WO | WO 00/60317 | 10/2000 |

* cited by examiner

*Primary Examiner*—Jewel V. Thompson
(74) *Attorney, Agent, or Firm*—Greer, Burns & Crain, Ltd

(57) ABSTRACT

A wedge unit according to the present invention is used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on a part of the outer circumference of the pipe and on another surface thereof being equipped with an ultrasonic oscillator that generates the ultrasonic wave in response to an electric signal and receives the reflected wave; and an ultrasonic wave attenuation unit being mounted on the outer circumference of the pipe so as to include a position where an ultrasonic wave injected from the ultrasonic oscillator into the pipe by way of the wedge first reaches the outer wall of the pipe after being reflected by the inner wall thereof.

48 Claims, 18 Drawing Sheets

WEDGE AND WEDGE UNIT FOR USE IN ULTRASONIC DOPPLER FLOW METER

BACKGROUND OF THE INVENTION

1. Field of the Invention

The present invention relates to a wedge and a wedge unit for use in an ultrasonic Doppler flow meter which is mounted (i.e., clamped) on the outer wall of a pipe having a fluid flowing inside thereof, supplying an ultrasonic wave (ultrasound) to the fluid, receives the reflected wave and supplies the reflected wave to a flow rate calculation unit.

2. Description of the Related Art

One of a conventional ultrasonic Doppler flow velocity profile meter is a clamp-on ultrasonic flow meter. The clamp-on ultrasonic flow meter is for measuring a flow rate of a flowing fluid inside a pipe by mounting (i.e., clamping) a material for propagating a wave into the pipe, i.e., a wedge, on a part of the outer circumference of the pipe and emitting the wave into the pipe by way of the wedge. Let it be assumed herein that a fluid is flowing horizontally in the pipe unless otherwise noted.

Clamp-on type ultrasonic flow meters include a propagation time difference and a Doppler method types.

In a propagation time difference-method clamp-on type ultrasonic flow meter, the ultrasonic wave is diagonally injected to the flowing fluid and returned therefrom, thereby measuring the flow rate by the difference in propagation time between the outward and homeward propagations.

While in a Doppler-method clamp-on type ultrasonic flow meter, the velocity of the fluid is measured (i.e., calculated) by that of suspended particles, et cetera, based on the assumption that suspended particles and air bubbles contained in a fluid flow at the same velocity as the fluid. In the Doppler method, an attention is focused on the fact that the frequency of an ultrasonic wave injected into a fluid is changed by the Doppler Effect as a result of being reflected by a suspended particle, and therefore the velocity of the particle is measured by detecting the frequency of the reflected ultrasonic wave.

FIG. 1 shows a configuration of a conventional Doppler-method clamp-on type ultrasonic flow meter.

In FIG. 1, the Doppler-method clamp-on type ultrasonic flow meter for example comprises a wedge 14 on one surface thereof being mounted on a part of the outer circumference of a pipe 31 and on another surface thereof being equipped with an ultrasonic oscillator 13 for generating an ultrasonic wave in response to an electric signal and receiving the reflecting ultrasonic wave back from a fluid within the pipe 31, a transmitter/receiver circuit 12 for generating a pulsed electric signal and supplying the signal to the ultrasonic oscillator 13 for driving it and a flow rate calculation unit (including an amplifier 21, A/D converter 22, velocity profile measurement unit 23, computer 24 and display unit 25).

The transmitter/receiver circuit 12 is, for example, comprised of an oscillator and a pulse generation circuit. The oscillator generates an electric signal having a basic frequency of f0, and the pulse generation circuit outputs a pulsed electric signal at a prescribed interval (i.e., 1/F rpf). The ultrasonic oscillator 13 generates an ultrasonic pulse by application of the pulsed electric signal thereto. The ultrasonic pulse is then transmitted to the pipe 31 by way of the wedge 14.

Note that the basic frequency f0 is essentially a required frequency defined in inverse proportion to the inner diameter of the pipe 31. Also, the ultrasonic pulse is a beam of translatory movement having a pulse width of approximately 5 mm for example.

Meanwhile, the surface of wedge 14 on which the ultrasonic oscillator 13 is mounted is inclined by a certain angle so that the normal line to the surface crosses with the direction of the normal line to the transverse section surface of the pipe 31 at an angle smaller than 90 degrees.

Meanwhile, the ultrasonic oscillator 13 functions as receiver for receiving the echo ultrasonic wave generated by an ultrasonic wave emitted by the ultrasonic oscillator 13 being reflected from a reflecting body suspended in a fluid 32 flowing in the pipe 31, in addition to the function of transmitter.

Such reflecting bodies in the fluid 32 include an air bubble consistently contained in a fluid, a particle such as aluminum particulate, a foreign material having a different acoustic impedance from the fluid subjected to measurement, et cetera.

An operation of the Doppler-method clamp-on type ultrasonic flow meter shown in FIG. 1 is then described as follows.

First, an ultrasonic pulse is injected into the fluid 32 in the pipe 31 from the ultrasonic oscillator 13 by application of a pulsed electric signal thereto, the ultrasonic pulse is reflected by a reflecting body suspended in the fluid 32, is received by the ultrasonic oscillator 13 as an ultrasonic echo, and then converted into an echo electric signal.

The echo electric signal is amplified by the amplifier 21, and the amplified echo electric signal is digitized by the A/D converter 22.

The digitized echo electric signal is then input to the velocity profile measurement unit 23. While FIG. 1 does not delineate clearly, the velocity profile measurement unit 23 receives an electric signal having the basic frequency of f0 from the oscillator of the transmitter/receiver circuit 12, measures velocity changes based on a Doppler shift according to the frequency difference between an echo electric signal and the electric signal having the basic frequency, calculates a velocity profile along the line of measurement in the respective area; and accordingly calculates a flow velocity profile across the transverse section of the pipe 31 by modifying the flow velocity profile calculated for the measurement area with the angle of the above described inclination.

The configuration of the flow rate calculation unit and the transmitter/receiver circuit shown in FIG. 1 is an example, and other types (of transmitter/receiver and calculation unit) are applicable.

DISCLOSURE OF THE INVENTION

The problem in relation to flow velocity profile measurement technique by a conventional Doppler-method clamp-on type ultrasonic flow profile meter is then described below. Before going into a detail, the problem is summarized as follows. That is, the ultrasonic echo used for measuring flow rate or a velocity profile is accompanied by acoustic noise caused by multiple reflections.

Since the identification of the problem plays a major role in the approach to the present invention, the above described problem will be further described below.

The operating principle of an ultrasonic Doppler flow meter is described in reference to FIG. 2.

As shown in the top of FIG. 2, an ultrasonic pulse emitted by the ultrasonic oscillator 13 is injected into the pipe 31 in a manner merging with the flow direction of the fluid 32 being subjected to measurement with an angle of α relative to the vertical. The ultrasonic pulse is met by a reflecting body consistently suspended in the fluid for instance and is reflected thereby, transforms itself to an ultrasonic echo, comes back the opposite way, and is received by the ultrasonic oscillator 13 and is then converted to an echo electric signal.

The second part of FIG. 2 shows the output, for example, of the A/D converter 22 shown in FIG. 1. In the second part of FIG. 2, the part indicated by the sign "a" corresponds to an ultrasonic echo being reflected by a reflecting body, "b" corresponds to a multiple reflection echo reflected by the pipe wall on the side where the ultrasonic pulse is emitted, and, "c" corresponds to multiple reflection echoes being reflected by the pipe wall on the side opposite the side where the ultrasonic pulse is injected from. Those signal parts indicated by the signs "a," "b" and "c" will be repeated in response to the ultrasonic pulse emitted from the ultrasonic oscillator in the prescribed interval (1/F rpf).

An A/D conversion process and a filtering process are further performed to the echo electric signal shown in the second part of FIG. 2, and then a flow velocity profile along the measuring line is calculated according to the Doppler shift method by the flow velocity profile measurement unit. The Doppler shift method is a velocity measurement method using the principle that the frequency of the above described ultrasonic echo shifts in proportion to the flow velocity.

The third part of FIG. 2 (at the bottom) shows the output of the flow velocity profile measurement unit, in which the horizontal axis indicates the positions along the line of measurement, while the vertical axis indicates the flow velocities corresponding to the respective positions.

Following the flow velocity acquisition, a flow rate is calculated using the following procedure. Such a method is disclosed in various documents such as the Patent Document 1, noted below.

First, a flow rate, m, of a fluid at a time, t, is given by the Equation (1) below, where ρ is the viscosity of a fluid subjected to measurement, and v(x, t) is a velocity component at the time, t.

$$m(t) = \rho \int v(x,t) \cdot dA \quad (1)$$

From the equation (1), a flow rate, m, of a fluid flowing in the pipe at a time, t, can be converted to the equation (2) below.

$$m(t) = \rho \int \int vx(r,\theta,t) \cdot r \cdot dr \cdot d\theta \quad (2)$$

Here, vx(r, θ, t) indicates a velocity component along the axis of the pipe (i.e., pipe axis direction) at a time, t, at a distance, r, from the center of the transverse section of the pipe, and in a direction of the angle, θ, viewed from a certain direction going through the center of the transverse section.

[Patent Document 1] Japanese patent laid-open application publication 2000-97742, "Ultrasonic Doppler flow meter".

The above described procedure makes it necessary to detect a velocity profile accurately to calculate the flow rate with accuracy. This necessity is independent of the fluid subjected to measurement being in a normal or abnormal condition.

Furthermore, since the flow velocity profole is obtained by signal processing of an ultrasonic echo returning from a reflecting body, ideally the ultrasonic echo should contain the required (preferable) acoustic signal alone.

In such a Doppler-method clamp-on type ultrasonic flow profile meter, however, because the acoustic impedance of a pipe (i.e., the material thereof) is larger than that of the fluid in the pipe, an ultrasonic wave injected from the ultrasonic oscillator into the pipe by way of the wedge is in large part reflected into the pipe wall at the border between the pipe and the fluid, followed by a multiple reflections within the pipe wall (i.e., between the outer and inner walls of the pipe). The fact that the multiple reflections are larger than the emission from the inner wall to the inside of the pipe, results in the required ultrasonic echo being coupled with a large amount of acoustic noise, thus causing error in the flow rate determination.

The above described phenomenon is then elaborated in reference to FIG. 3.

In FIG. 3, an ultrasonic wave emitted from the ultrasonic oscillator 13 is injected to the wedge 14 along the line of incidence 201, then into the pipe 31 along the incident line 202a, as far as the inside wall of the pipe 31.

On the inside wall of the pipe 31, the ultrasonic wave branches into one component ultrasonic wave penetrating the inside wall and penetrating into the fluid along the incident line 202b, and another component reflecting against the inside wall of the pipe towards the outside wall of the pipe along a sidetrack 203.

The ultrasonic wave reaching the outer wall is reflected thereby in almost its entirety and once again is directed toward the inside wall along the sidetrack 204a, followed by similar branching into one component ultrasonic wave penetrating into the fluid 32 along the sidetrack 204b and another component ultrasonic wave being reflected by the inside wall and directed toward the outside wall.

Each component ultrasonic wave, while going back and forth along these lines (paths) as described above, will be received by the ultrasonic oscillator 13 as an ultrasonic echo, and thereby a flow velocity profile and the resultant flow rate are obtained.

That is, the ultrasonic echo going along the incident paths 202b, 202a, 201, back to the ultrasonic oscillator 13 and the echo going along the sidetracks 204b, 204a, 203, 202a, 201 back to the ultrasonic oscillator 13. Among these, the ultrasonic echo going along the incident lines 202b, 202a, 201, back to the ultrasonic oscillator 13 is called the "preferable ultrasonic echo."

The problem associated with FIG. 3 is that the preferable ultrasonic echo is accompanied by the ultrasonic echoes going back to the ultrasonic oscillator 13 along the sidetracks 204b, 204a, 203, 202a, 201, for example, as acoustic noise.

First, well known equations will be derived in order to describe the above problem.

FIG. 4 describes the way a sound wave, in heading from a medium 1 to medium 2, either is reflected or penetrates at the interface between the two media 1 and 2.

In FIG. 4, when a sound wave enters from the media 1 to 2 at an incident angle of θin from the vertical direction of the interface, the relationship between the incident, reflected and transmitted (penetrating) waves is given by the following equation (3) (based on Snell's law).

$$\frac{\sin\theta_{in}}{c_1} = \frac{\sin\theta_{out}}{c_2} = \frac{\sin\theta_{ref}}{c_1} \quad (3)$$

Where in equation (3), c1 is the sound velocity in medium 1, c2 is the sound velocity in medium 2, θin is the angle of incidence in medium 1, θout is the angle of incidence in medium 2 and θref is the reflected angle in medium 1.

Meanwhile, the acoustic impedance Z1 and Z2 of the media 1 and 2, respectively, each is given by the equations (4) and (5).

$$z_1 = \rho_1 c_1 \quad (4)$$

$$z_2 = \rho_2 c_2 \quad (5)$$

In the equations (4) and (5), c1 is the sound velocity in medium 1, c2 is the sound velocity in medium 2, ρ1 is the density of medium 1 and ρ2 is the density of medium 2.

In this case, the penetration and the reflection ratios of a sound pressure wave are given by the equations (6) and (7), respectively.

$$Tp = \frac{2Z_2 \cos\theta_{in}}{Z_2 \cos\theta_{in} + Z_1 \cos\theta_{out}} \quad (6)$$

$$Rp = \frac{Z_2 \cos\theta_{in} - Z_1 \cos\theta_{ref_{in}}}{Z_2 \cos\theta_{in} + Z_1 \cos\theta_{ref}} \quad (7)$$

The reflection ratio and the penetration ratio at the interface of the pipe and the fluid in the pipe are obtained by applying these equations to the pipe (material thereof) and the fluid.

FIG. 5 shows an example calculation in the case of using stainless steel for the pipe material and water as the fluid flowing therein.

Stainless steel has a sound velocity of 3250 m/sec and a density of $7.91*10^3$ kg/m$^3$, while water has a sound velocity of 1490 m/sec and a density of $1.00*10^3$ kg/m$^3$.

As shown in FIG. 5, given that the angle of incidence of the ultrasonic wave from the pipe is 47° (degree), a penetration ratio of 6% and a reflectance ratio of 94% are obtained by using equations (6) and (7), making it apparent that most of the ultrasonic wave is reflected within the pipe wall, leaving only a small fraction thereof penetrating the water.

The penetration and reflectance ratios of the ultrasonic wave reflected by the inner wall of the pipe can be likewise calculated.

Since the stainless steel contacts with air on the outer wall of the pipe, which has a sound velocity of 344 m/sec and a density of $1.293*10^3$ kg/m$^3$, using equations (6) and (7), a penetration ratio of 0.001% and a reflectance ratio of 99.999% are obtained. That is, most of the ultrasonic wave is reflected inside the wall, instead of being emitted into the air.

Again the same calculation for the ultrasonic wave reaching the interface between the pipe (made of stainless steel) and a fluid (water in this case) gives a ratio of sound pressure penetrating into water of 5.4%, where the ratio is relative to the sound pressure initially penetrating the pipe, which is considered to be 100%.

In order to show how the ultrasonic echo responding to an initial penetrating wave, that is, the preferable ultrasonic wave, is actually accompanied by an ultrasonic wave resulting from a reflected wave, the wall thickness and inner diameter of a pipe have to be specified.

A thickness of 6 mm and inner diameter of 102 mm are assumed for the pipe here.

The incident path (length) is calculated from the incident angle (i.e., 47° in this case), and a time of travel in a medium is calculated by dividing by the sound velocity of the respective medium (i.e., stainless steel or water in this case).

Comparing the corresponding positions along the sidetracks 204 band 202b of the inner wall, the ultrasonic echo wave occurring in a certain position along sidetrack 204b is received by the ultrasonic oscillator 13 later by a time corresponding to traveling (back and forth) along sidetracks 203 and 204a as compared with the ultrasonic echo wave occurring in the corresponding position along sidetrack 202b.

Therefore, a period of time in which the ultrasonic echoes occurring in random positions along the sidetrack 204b are received by the ultrasonic oscillator 13 continuously in terms of time is overlapped by the delay of time which the ultrasonic wave or the ultrasonic echo wave travels back and forth along sidetracks 203 and 204a, with a period of time in which the ultrasonic echoes occurring in random positions along the incident line 202b are received by the ultrasonic oscillator 13 continuously in terms of time.

FIG. 6 shows how the ultrasonic echoes are overlapped and received by the ultrasonic oscillator.

In FIG. 6, from the above described thickness and inner diameter of the pipe and the angle of incidence, the distance of a return trip along the sidetracks 203 and 204a is 12.2 mm*4=48.8 mm so that the delay time due to the return trip is 15 micro sec, taking the transverse wave velocity as 3250 m/sec for the stainless steel pipe. The time for the ultrasonic wave to take a return trip in water along the sidetracks such as 202b and 204b is 137 micro sec by taking the sound velocity in water as 1490 m/sec. Therefore the overlapped ultrasonic echo signals from the sidetracks 202b and 204b are overlapped and received by the ultrasonic oscillator 13 for the duration X shown by FIG. 6.

FIG. 7 describes how noise is generated as a result of echo signals being overlapped.

In FIG. 7, the label I shows the flow velocity profile based on the ultrasonic echo along the incident path 202b; the label II shows the flow velocity profile based on the ultrasonic echo along the sidetrack 204b; and the label III shows the flow velocity profile as a result of overlapping the flow velocity profiles based on the ultrasonic echoes along the incident and sidetrack paths. FIG. 7 makes it apparent that the flow velocity profile (i.e., as indicated by III) as a measurement result is shifted from a preferable (required, desired, actual, needed) flow velocity profile.

FIG. 8 is a cross section view of a wedge equipped conventional Doppler-method clamp-on type ultrasonic flow meter together with part of the pipe it is clamped to. This figure also shows a second problem associated with the conventional technique.

In FIG. 8, a wedge 52 equipped with an ultrasonic oscillator 51 is clamped to a part of the outer wall of a pipe 53.

FIG. 8 corresponds to a case in which the thickness of the pipe is small as compared to the diameter of the ultrasonic oscillator (i.e., the ratio of the former to the latter is less than a prescribed value). In this case, multiple reflections occur within the width of the ultrasonic beam as shown in the figure. That is, an ultrasonic beam entering from the outer wall of the pipe at the position P11 for instance reaches the position P12 where it gets overlapped with another ultrasonic beam entering from the outer wall, thereby causing multiple reflections.

The number of the incident lines (paths) used for measuring (calculating) a flow velocity in a pipe is proliferated in accordance with the number of multiple reflections. The ultrasonic echo signals traveling along the resultant sidetracks being overlapped with the required ultrasonic echo signal causes the problem of an error in calculating the flow velocity profile or flow rate.

SUMMARY OF THE INVENTION

The object of the present invention is to provide a wedge and a wedge unit for use in an ultrasonic Doppler flow meter capable of reducing acoustic noise.

A first wedge unit of the present invention is a wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on a part of the outer circumference of the pipe and on another surface thereof being equipped with an ultrasonic oscillator that generates the ultrasonic wave in response to an electric signal and receives the reflected wave; and an ultrasonic wave attenuation unit being mounted on the outer circumference of the pipe so as to include a position where an ultrasonic wave injected from the ultrasonic oscillator into the pipe by way of the wedge first reaches the outer wall of pipe after being reflected by the inner wall of the pipe.

Meanwhile, a wedge of the present invention is a wedge used for an ultrasonic Doppler flow meter, being mounted on an outer wall of a pipe in which a fluid flows, supplying an ultrasonic signal to the fluid, receives the reflected wave and supplies the reflected wave to a flow rate calculation unit, wherein one surface of the wedge is mounted on a part of the outer circumference of the pipe and another surface thereof is equipped with an ultrasonic oscillator that generates the ultrasonic wave in response to an electric signal and receives the reflected wave, and the diameter of the ultrasonic oscillator is defined so that the projected size of the ultrasonic wave emitted by the ultrasonic oscillator impressed against the outer wall of the pipe, depending on the inclination angle of another surface of the wedge being equipped with the ultrasonic oscillator, does not exceed the difference between a position where the ultrasonic wave is injected from the outer wall of the pipe and a position where the ultrasonic wave first reaches the outer wall of the pipe after being reflected by the inner wall thereof.

Meanwhile, a second wedge unit of the present invention is a wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on a part of the outer circumference of the pipe and on another surface thereof being equipped by an ultrasonic oscillator that generates the ultrasonic wave in response to an electric signal and receives the reflected wave, and a spacer being installed between the wedge and the pipe.

DESCRIPTION OF THE PREFERRED EMBODIMENTS

Figure 1:
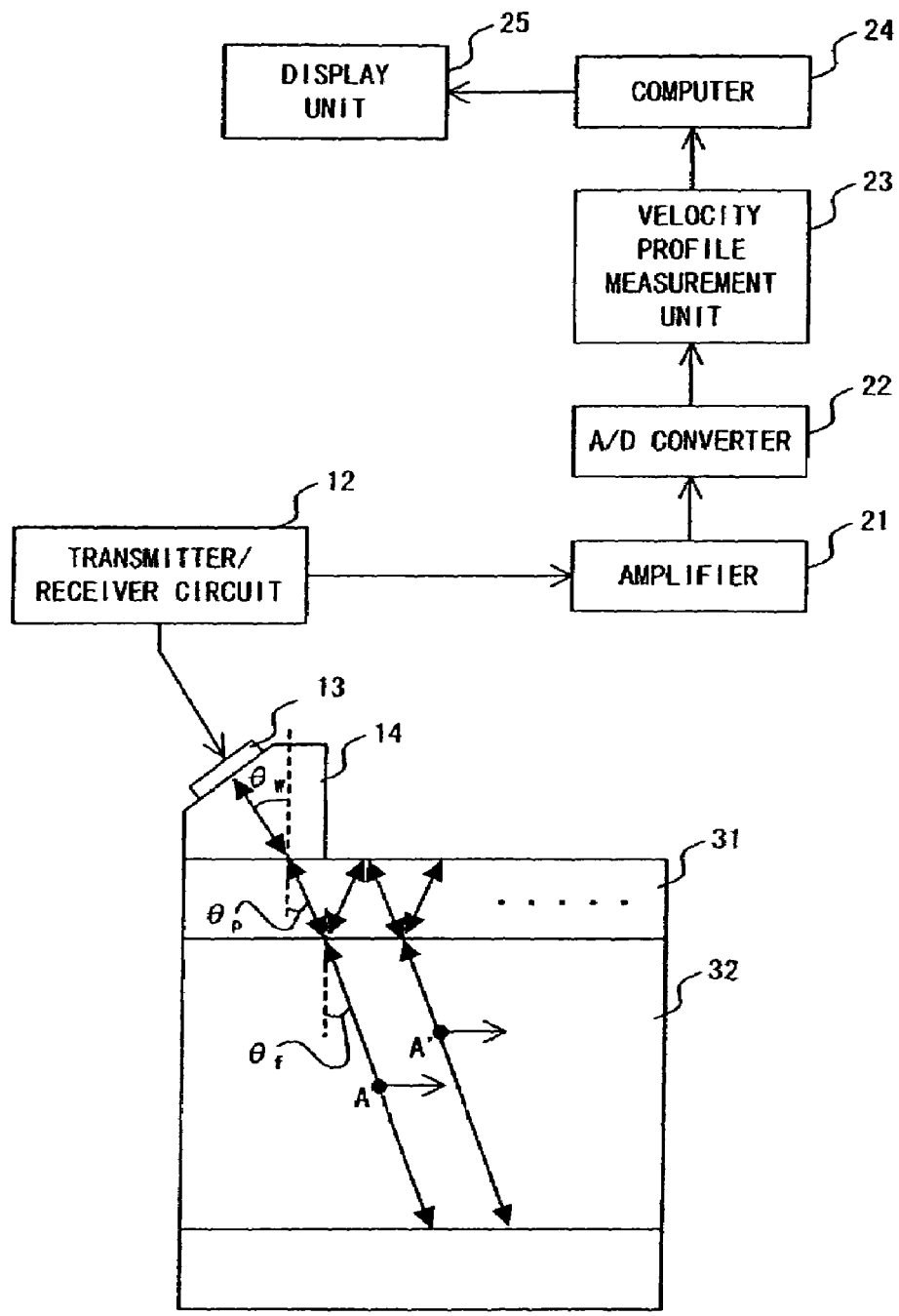
FIG. 1 shows the configuration of a conventional Doppler-method clamp-on type ultrasonic flow meter.
Figure 2:
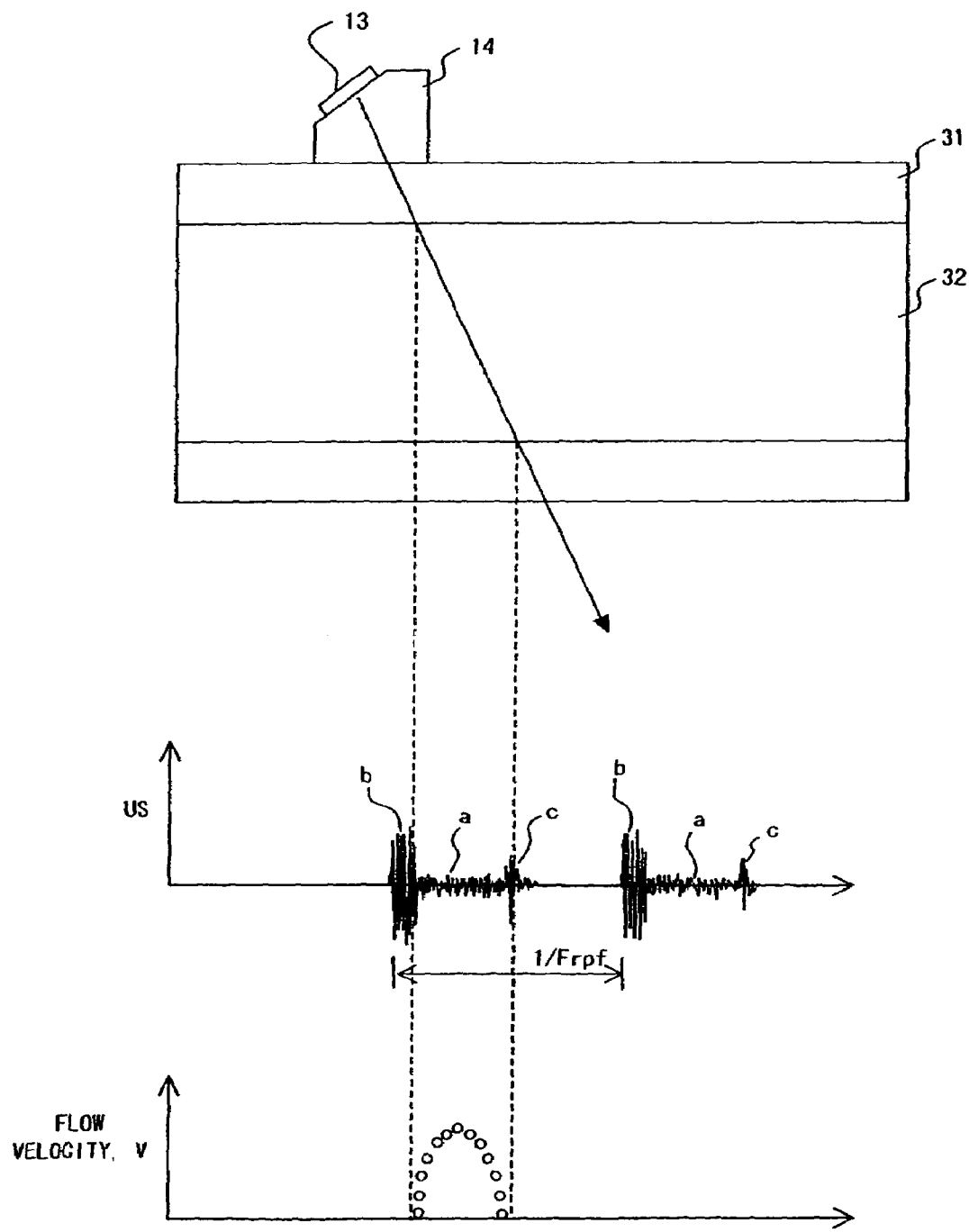
FIG. 2 shows the principle of operation of an ultrasonic Doppler flow meter in which the first part shows how an ultrasonic pulse is emitted into the pipe; the second part shows the output from the A/D converter shown in FIG. 1; and the bottom part shows the output of the flow velocity profile measurement unit shown in FIG. 1.
Figure 3:
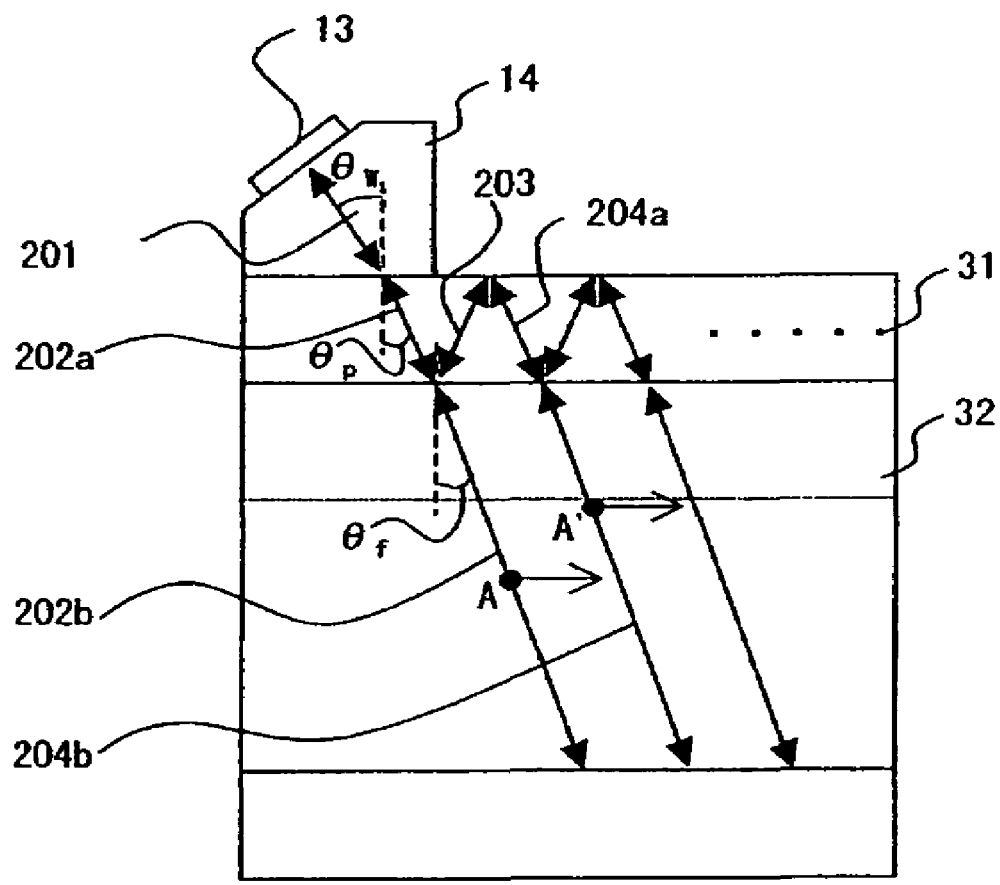
FIG. 3 describes an ultrasonic echo accompanied by noise in a conventional example.
Figure 4:
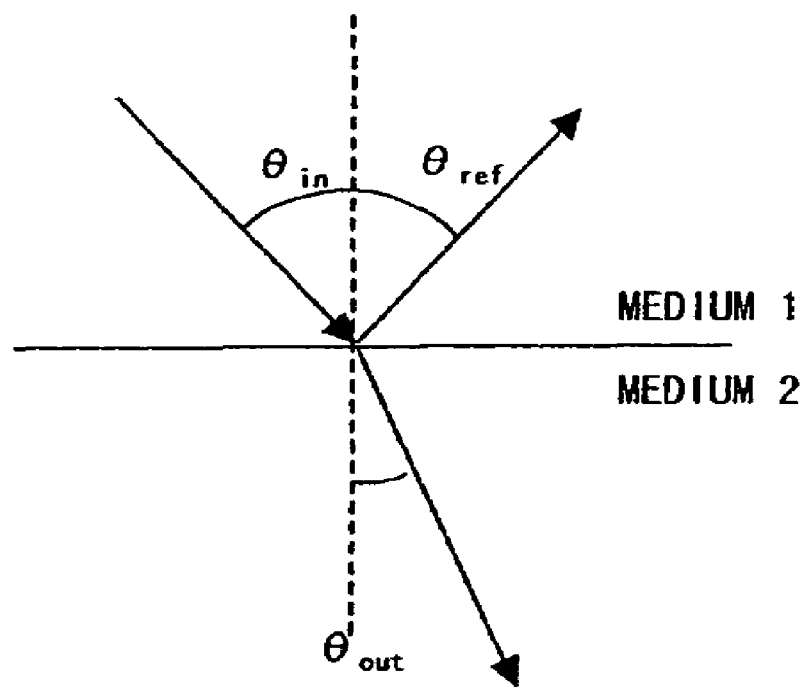
FIG. 4 describes the way a sound wave, in traveling from a medium 1 to medium 2, is either reflected or penetrates at the interface between the two media 1 and 2.
Figure 5:
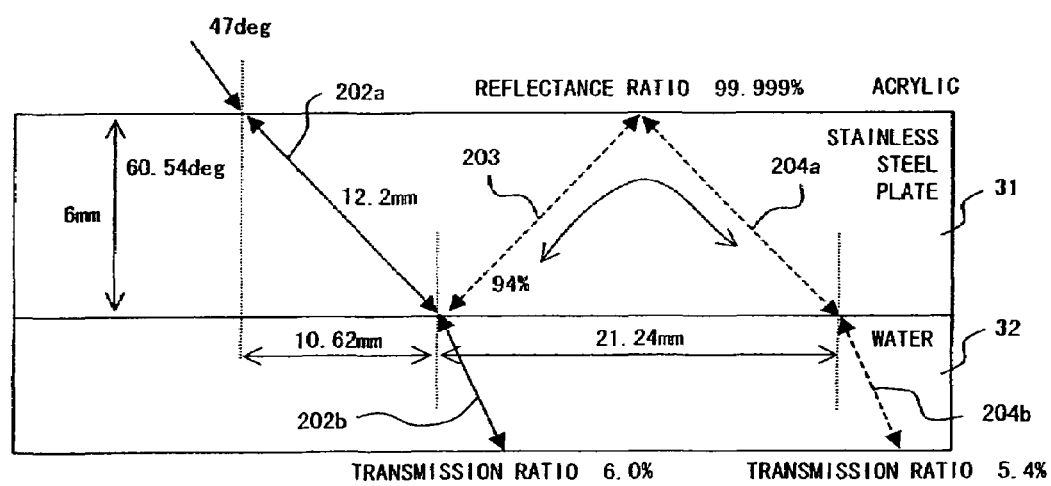
FIG. 5 shows an example calculation in the case of a stainless steel pipe and water flowing therein.
Figure 6:
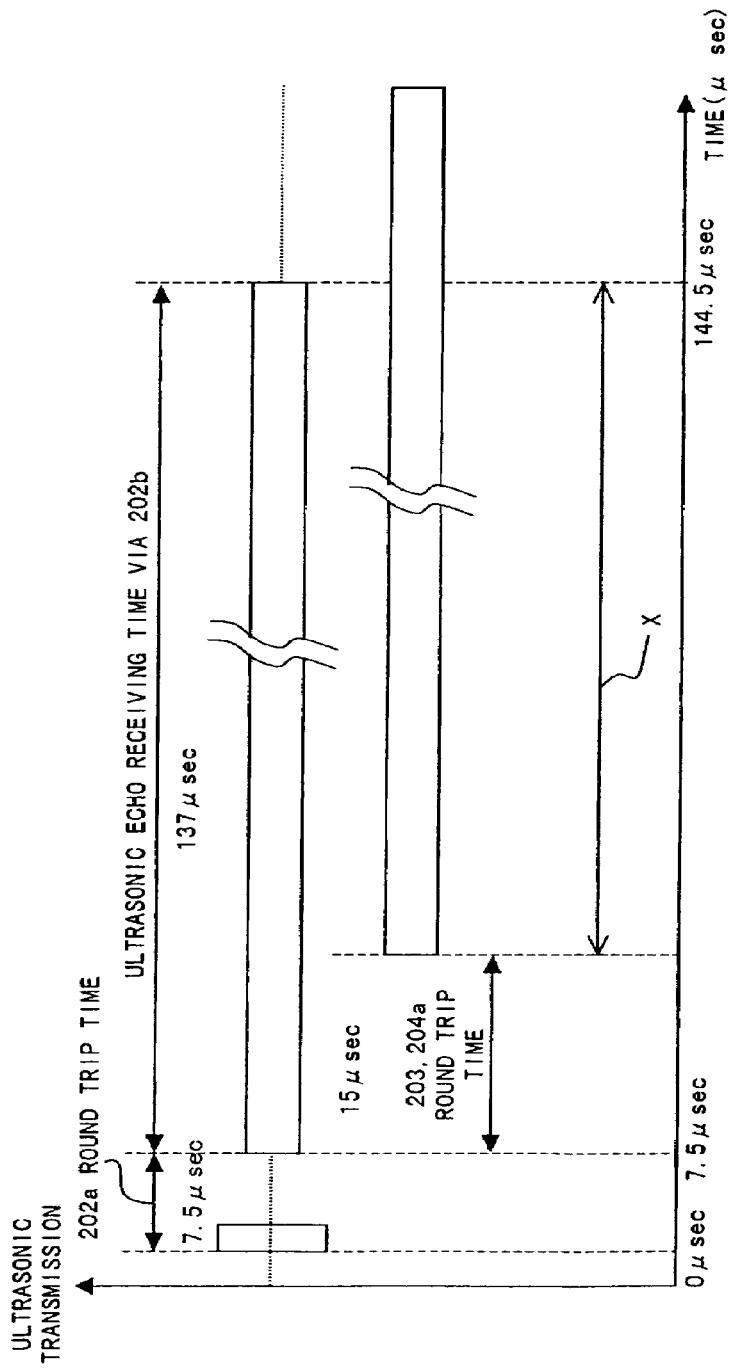
FIG. 6 shows how the ultrasonic echoes along various sidetracks are overlapped and received by the ultrasonic oscillator in a conventional example.
Figure 7:
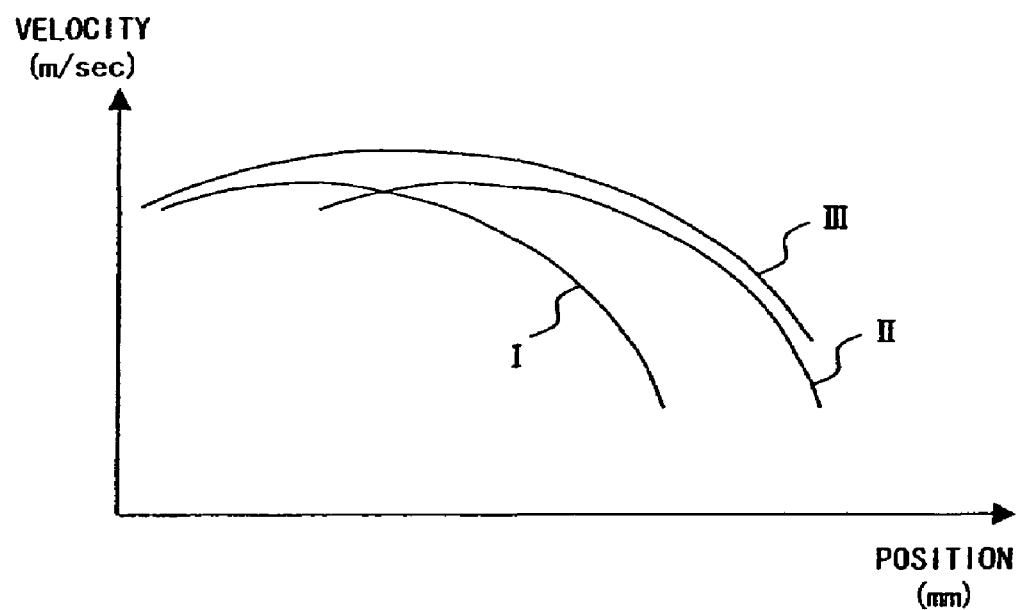
FIG. 7 shows how noise is generated as a result of the echo signals being overlapped in a conventional example.
Figure 8:
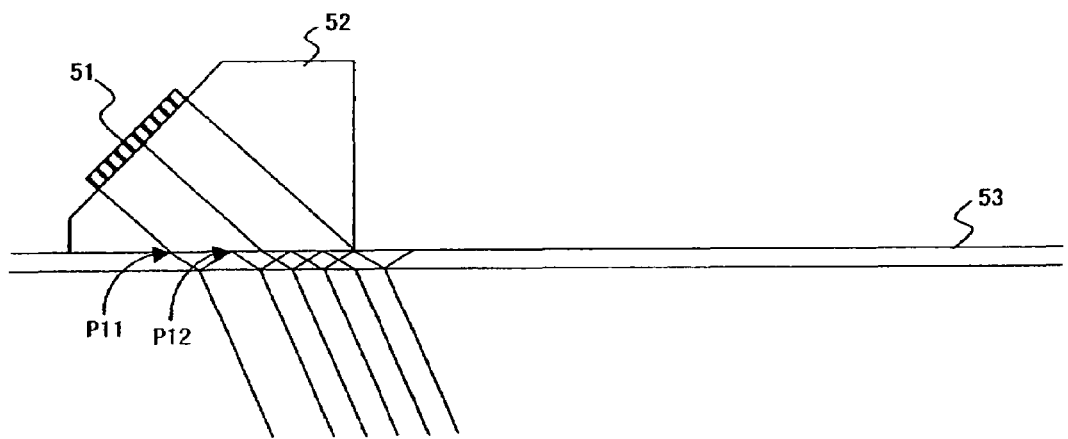
FIG. 8 is a cross section view of a conventional wedge equipped Doppler-method clamp-on type ultrasonic flow meter together with part of the pipe it is clamped to, and also explains a second problem associated with the conventional technique.

The preferred embodiment for achieving the present invention is described in detail while referring to the accompanying drawings as follows.

A wedge unit of a first aspect of the present invention, is used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on a part of the outer circumference of the pipe and on another surface thereof being equipped with an ultrasonic oscillator that generates the ultrasonic wave in response to an electric signal and receives the reflected wave; and an ultrasonic wave attenuation unit being mounted on the outer circumference of the pipe so as to include a position where an ultrasonic wave emitted by the ultrasonic oscillator into the pipe by way of the wedge first reaches the outer wall of the pipe after being reflected by the inner wall of the pipe.

Here, equipping an ultrasonic wave attenuation unit being mounted on the outer circumference of the pipe so as to include a position where the reflected ultrasonic wave first reaches the outer wall of the pipe and thereby absorbs a part of the ultrasonic wave reaching the outer wall of the pipe enables attenuation of echo signals causing noise coming back along sidetracks caused by further reflections from the outer wall of the pipe and being received by the ultrasonic oscillator and reduction of acoustic noise.

A wedge unit of a second aspect of the present invention, is used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on part of the outer circumference of the pipe and on another surface thereof being equipped with an ultrasonic oscillator that generates the ultrasonic wave in response to an electric signal and receives the reflected wave; and an ultrasonic wave transmission unit having an acoustic impedance approximately the same as the pipe and being mounted on the outer circumference of the pipe so as to include a position where an ultrasonic wave emitted by the ultrasonic oscillator into the pipe by way of the wedge first reaches the outer wall of the pipe after being reflected by the inner wall thereof.

Here, mounting an ultrasonic wave transmission unit on the outer circumference of the pipe so as to include a position where the reflected ultrasonic wave first reaches the outer wall of the pipe and thereby transmits the ultrasonic wave reaching the outer wall of the pipe enables a reduction of echo signals returning to the ultrasonic oscillator by diffusing ultrasonic waves transmitted from the outer wall of the pipe as a result of further reflections against surfaces of the ultrasonic wave transmission unit and a reduction of acoustic noise.

A wedge of a third aspect of the present invention, is used for an ultrasonic Doppler flow meter, being mounted on the outer wall of a pipe in which a fluid flows, supplying an ultrasonic wave to the fluid, receives the reflected wave, and supplies the reflected wave to a flow rate calculation unit, wherein one surface is mounted on a part of the outer circumference of the pipe and another surface is equipped with an ultrasonic oscillator that generates the ultrasonic wave by using an electric signal and receives the reflected wave, and the diameter of the ultrasonic oscillator is defined so that the projected size of the ultrasonic wave emitted by the ultrasonic oscillator impressed against the outer wall of the pipe determined by the inclination angle of another surface of the wedge being equipped with the ultrasonic oscillator, does not exceed the difference between a position where the ultrasonic wave is injected from the outer wall of the pipe and a position where the ultrasonic wave first reaches the outer wall of the pipe after being reflected by the inner wall thereof.

Here, it is possible to avoid proliferation of sidetracks by ultrasonic waves overlapping with one another within the projected diameter of the ultrasonic oscillator and eliminate deviation from the preferable ultrasonic echo as a result of it being accompanied by ultrasonic echo signals returning along the multiplied sidetracks.

Meanwhile, a wedge unit of a fourth aspect of the present invention, is used for an ultrasonic Doppler flow meter, being mounted on an outer wall of a pipe in which a fluid flows, supplying an ultrasonic wave to the fluid, receives the reflected wave and supplies the reflected wave to a flow rate calculation unit, comprises a wedge with one surface thereof being mounted on a part of the outer circumference of the pipe and on another surface thereof being equipped with an ultrasonic oscillator that generates the ultrasonic wave in response to an electric signal and receives the reflected wave; and an ultrasonic wave attenuation member for attenuating an ultrasonic wave component adding a noise to an ultrasonic echo signal, wherein the diameter of the ultrasonic oscillator is defined so that the projected size of the ultrasonic beam emitted by the ultrasonic oscillator impressed on the outer wall of the pipe determined by the inclination angle of another surface of the wedge being mounted by the ultrasonic oscillator, does not exceed the difference between a position where the ultrasonic wave is injected from the outer wall of the pipe and a position where the ultrasonic wave first reaches the outer wall of the pipe after being reflected by the inner wall thereof, and an ultrasonic wave attenuation member is mounted on the outer circumference of the pipe so as to avoid the projection of the ultrasonic beam by the ultrasonic oscillator.

Here, it is possible to prevent the ultrasonic wave from entering the outer wall of the pipe and being reflected thereby as a result of entering the ultrasonic attenuation material first in the fourth aspect, in addition to the third aspect.

Meanwhile, a wedge unit of a fifth aspect of the present invention, is used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on a part of the outer circumference of the pipe and on another surface thereof being equipped with an ultrasonic oscillator that generates the ultrasonic wave in response to an electric signal and receives the reflected wave; first and second beam diameter limitation units for limiting an ultrasonic beam diameter emitted by the ultrasonic oscillator and being mounted on the bottom surface of the wedge, wherein at least one of the first and second beam diameter limitation units doubles as an ultrasonic wave attenuation member for attenuating an ultrasonic wave component adding noise to an ultrasonic echo signal.

Here, it is possible to reduce the rate of sidetrack multiplication due to overlapping ultrasonic waves with one another within the limited beam diameter, responding to a combination of a slit and an ultrasonic wave attenuation member, and the error caused by the required ultrasonic echo signal being overlapped by an ultrasonic echo signal received by way of the multiplied sidetracks.

In the above described fifth aspect, the beam diameter limitation unit or the ultrasonic wave attenuation member may be mounted so that the projected size of the beam incident on the outer wall of the pipe does not exceed the difference between a position where any of the beam gets injected from the outer wall of the pipe and a position where the beam first reaches the outer wall of the pipe after being reflected by the inner wall of the pipe.

Meanwhile, a wedge of a sixth aspect of the present invention, is used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, wherein the wedge on one surface thereof is mounted on a part of the outer circumference of the pipe and on another surface thereof is equipped with an ultrasonic oscillator for generating the ultrasonic wave in response to an electric signal and receiving the reflected signal, and is equipped by a beam diameter limitation unit for limiting the ultrasonic beam diameter emitted by the ultrasonic oscillator inside the wedge.

Here, it is possible to reduce the rate of sidetrack multiplication due to overlapping ultrasonic waves with one another, responding to an extension of the slit limiting the beam diameter, and an error caused by the required (preferable) ultrasonic echo signal being overlapped with an ultrasonic echo signal received by way of the multiplied sidetracks.

Meanwhile, a wedge unit of a seventh aspect of the present invention, is used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on part of the outer circumference of the pipe and on another surface thereof being equipped with an ultrasonic oscillator that generates the ultrasonic wave by using an electric signal and receives the reflected wave, and additionally inside thereof being equipped by a beam diameter limitation unit for limiting the ultrasonic beam diameter emitted by the ultrasonic oscillator; and an ultrasonic wave attenuation member for attenuating an ultrasonic wave component adding noise to an ultrasonic echo signal.

In the above described seventh aspect, the beam diameter limitation unit may be mounted inside the wedge so that the projected size of the limited beam diameter incident on the outer wall of the pipe does not exceed the difference between a position where any of the beam enters from the outer wall of the pipe and a position where the beam first reaches the outer wall of the pipe after being reflected by the inner wall thereof.

Also in the above described seventh aspect, the ultrasonic wave attenuation member may be mounted on the outer circumference of the pipe so as to avoid a position where an ultrasonic wave emitted from the ultrasonic oscillator first reaches the outer wall of the pipe. Also in the above described seventh aspect, the ultrasonic wave attenuation member may be mounted on the outer circumference of the pipe so as to include a position where an ultrasonic beam reaches the outer wall of the pipe after being reflected by the inner wall thereof.

Meanwhile, a wedge unit of an eighth aspect of the present invention, is used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprises a wedge with one surface thereof being mounted on a part of the outer circumference of the pipe and on another surface thereof being equipped with an ultrasonic oscillator that generates the ultrasonic wave by using an electric signal and receives the reflected wave, and a spacer being installed between the wedge and the pipe.

Here, it is possible to reduce the rate of sidetrack multiplication due to overlapping ultrasonic waves with one another within the diameter of an ultrasonic oscillator, by the spacer installed between the wedge and the outer wall of the pipe, and an error caused by the required (preferable) ultrasonic echo signal being overlapped with ultrasonic echo signals received by way of the multiplied sidetracks.

In the above described eighth aspect, the thickness of the spacer may be adjusted so that the projected size of the ultrasonic beam emitted by the ultrasonic oscillator, which is dependent on the inclination angle of another surface of the wedge being equipped by the ultrasonic oscillator, impressed on the contact surface of the spacer with the wedge does not exceed the difference between a position where the ultrasonic wave enters from the contact surface and a position where the ultrasonic wave first reaches the contact surface after being reflected by the inner wall of the pipe.

By this configuration, it is possible to avoid a multiplication of sidetracks within the diameter of an ultrasonic oscillator, and an error caused by the required (preferable) ultrasonic echo signal being overlapped with ultrasonic echo signals received by way of the multiplied sidetracks.

According to a wedge unit for use in an ultrasonic Doppler flow meter of the first aspect of the present invention, since an ultrasonic wave attenuation unit is mounted so as to include a position where an ultrasonic wave first reaches the outer wall of a pipe, thereby absorbing a part of the ultrasonic wave reaching the outer wall of the pipe, it is possible to attenuate noise-adding ultrasonic echo signals received by the ultrasonic oscillator by way of the sidetracks caused by further reflections at the outer wall of the pipe, and reduce acoustic noise. Also a reduction of acoustic noise can improve the accuracy of measurement of velocity profile and flow rate.

According to a wedge unit for use in an ultrasonic Doppler flow meter of the second aspect of the present invention, since an ultrasonic wave transmission unit is mounted so as to include a position where an ultrasonic wave first reaches the outer wall of a pipe, thereby transmitting an ultrasonic wave first reaches the outer wall of the pipe, it is possible to reduce noise-adding ultrasonic echo signals received by the ultrasonic oscillator by diffusing transmitted wave from the outer wall of the pipe by further reflections at the surface of the ultrasonic wave transmission unit, and acoustic noise. Also a reduction of acoustic noise can improve the accuracy of measurement of velocity profile and flow rate.

According to a wedge for use in an ultrasonic Doppler flow meter of the third aspect of the present invention, it is possible to avoid a multiplication of sidetracks by ultrasonic waves overlapping with one another within the diameter of the ultrasonic oscillator and eliminate error in a required ultrasonic echo as a result of it being accompanied by ultrasonic echo signals returning along the multiplied sidetracks. Therefore a reduction of acoustic noise is enabled.

According to a wedge unit for use in an ultrasonic Doppler flow meter of the fifth aspect of the present invention, it is possible to reduce the rate of sidetrack multiplication due to overlapping ultrasonic waves with one another within the limited beam diameter, responding to a combination of a slit and an ultrasonic wave attenuation member, and error caused by the required (preferable) ultrasonic echo signal being overlapped with an ultrasonic echo signal received by way of the multiplied sidetracks. This then enables a reduction of acoustic noise.

According to a wedge for use in an ultrasonic Doppler flow meter of the sixth aspect of the present invention, it is possible to reduce the rate of sidetrack multiplication due to overlapping ultrasonic waves with one another within the beam diameter, corresponding to an extension of the slit limiting the beam diameter, and error caused by the required ultrasonic echo signal being overlapped with ultrasonic echo signals received by way of the multiplied sidetracks. Therefore a reduction of acoustic noise is enabled.

According to a wedge unit for use in an ultrasonic Doppler flow meter of the eighth aspect of the present invention, it is possible to reduce or eliminate the rate of sidetrack multiplication due to ultrasonic waves overlapping with one another within the diameter of the ultrasonic oscillator, by the spacer installed between the wedge and the outer wall of the pipe, and error caused by the required ultrasonic echo signal overlapping with ultrasonic echo signals received by way of the multiplied sidetracks. Therefore a reduction of acoustic noise is enabled.

Figure 9:
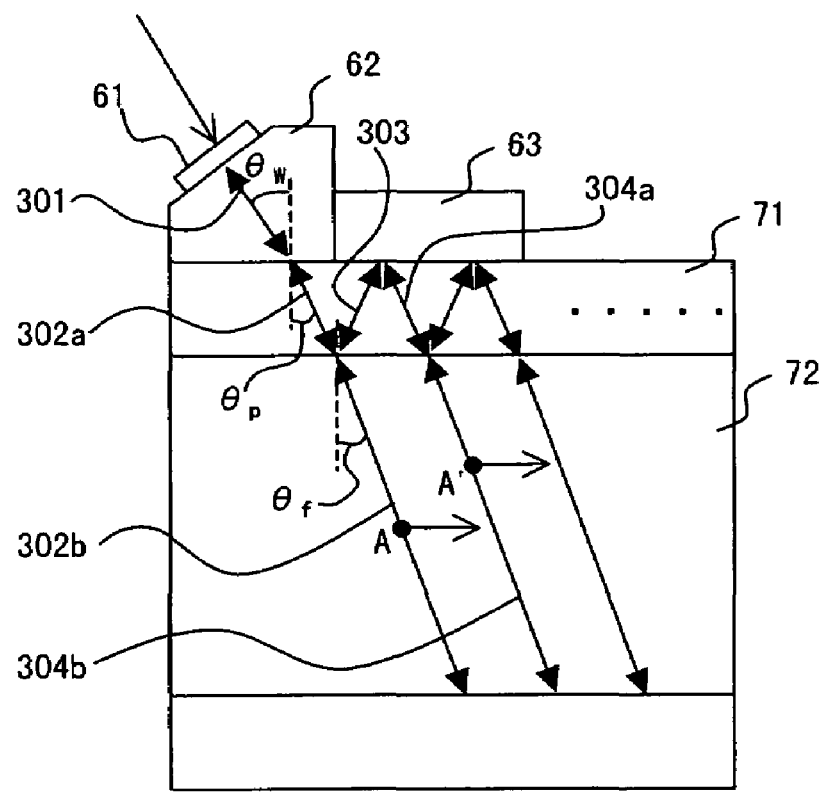
FIG. 9 shows the configuration of a wedge unit for use in an ultrasonic Doppler flow meter of the first embodiment according to the present invention.

FIG. 9 shows a configuration of wedge unit for use in an ultrasonic Doppler flow meter of a first embodiment according to the present invention.

In FIG. 9, the wedge unit for use in an ultrasonic Doppler flow meter is configured by a wedge 62 with one surface thereof being mounted on a part of the outer circumference of a pipe 71 and on another surface thereof being equipped with an ultrasonic oscillator 61 that generates an ultrasonic wave in response to an electric signal and receives the reflected (ultrasonic) wave from a fluid 72 in the pipe 71; and an ultrasonic wave attenuation unit 63 being mounted on the outer circumference of the pipe 71 so as to include a position where an ultrasonic wave injected from the ultrasonic oscillator 61 into the pipe 71 by way of the wedge 62 first reaches the outer wall of the pipe 71 after being reflected by the inner wall of the pipe 71.

Let it be known that the ultrasonic pulse is a beam of translatory movement having a pulse width of approximately 5 mm for example.

Also, the wedge 62 as a medium conveying an ultrasonic wave generated by an ultrasonic oscillator 61 to the pipe 71 is configured by a plastic material such as acrylic, polyvinyl chloride, et cetera, while the ultrasonic oscillator 61 is configured by a piezoelectric material such as PZT (lead zirconate titanate) and fixed onto the wedge 62 by using an epoxy resin adhesive for instance.

The surface of the wedge 62 which the ultrasonic oscillator 61 is mounted on is inclined by a prescribed angle so that the line normal to the surface crosses the normal to the transverse section surface (i.e., the longitudinal direction) of the pipe 31 at an angle smaller than 90° (90°−θw).

Meanwhile, the ultrasonic oscillator 61 functions, in addition to a transmitter, as receiver for receiving echo ultrasonic waves borne by an ultrasonic wave emitted from the ultrasonic oscillator 61 colliding with and being reflected by a reflecting body suspended in the fluid 72 flowing in the pipe 71.

In FIG. 9, an ultrasonic wave emitted from the ultrasonic oscillator 61 is injected into the wedge 62 along the line of incidence 301 and into the pipe 71 along the line of incidence 302a, and then reaches the inner wall of the pipe 71 along the line of incidence 302a.

At the inner wall of the pipe 71, the ultrasonic wave splits into an ultrasonic wave component penetrating the inner wall of the pipe and penetrating the fluid along the line of incidence 302b, and another ultrasonic wave component at the inner wall of the pipe 71 being reflected by the inner wall of the pipe and going toward the outer wall of the pipe along a sidetrack 303.

A certain portion of the ultrasonic wave component reaching the outer wall gets injected into an ultrasonic wave attenuation member 63 which is mounted onto the outer wall so as to include the relevant position, and the rest of the ultrasonic wave component gets reflected by the outer wall, again going toward the inner wall along the sidetrack 304a.

By thus letting the ultrasonic wave attenuation member absorb a portion of the ultrasonic wave reaching the interface with the pipe, the ultrasonic wave component going toward the inner wall along the sidetrack 304a is weakened and the noise added to the required ultrasonic echo (i.e., the ultrasonic wave echo corresponding to an ultrasonic wave penetrating into the fluid along the incident line 302b) by the ultrasonic wave component penetrating into the fluid along the sidetrack 304b is thereby reduced to a level that causes no error in the measurement data.

As such, since a certain portion of ultrasonic waves reaching the outer wall of pipe are absorbed by the ultrasonic wave attenuation member 63 installed so as to cover the position where the ultrasonic wave component reflected on the inner wall of the pipe first reaches the outer wall of the pipe (along the sidetrack 303), it is possible to attenuate noise-adding echo signals received by the ultrasonic oscillator 61 by way of the sidetracks proliferating as a result of further reflections at the outer wall of the pipe, and therefore reduce the acoustic noise.

In the meantime, an ultrasonic wave reaching the inner wall likewise splits into an ultrasonic wave component being injected into the fluid 72 in the pipe 71 along the sidetrack 304b and the other ultrasonic wave component getting reflected by the inner wall and going toward the outer wall.

Each of the ultrasonic wave components is again received by the ultrasonic oscillator 61 as an ultrasonic echo after traveling back and forth along the sidetracks, and a flow velocity profile and a flow rate are calculated by a flow rate calculation unit (not shown) based on the ultrasonic wave echo.

Shown in FIG. 9 for example are the ultrasonic echo going back to the ultrasonic oscillator 61 along the incident paths 302b, 302a and 301, and another ultrasonic echo going back to the ultrasonic oscillator 61 along the sidetracks 304b, 304a, 303, 302a and 301.

Figure 10:
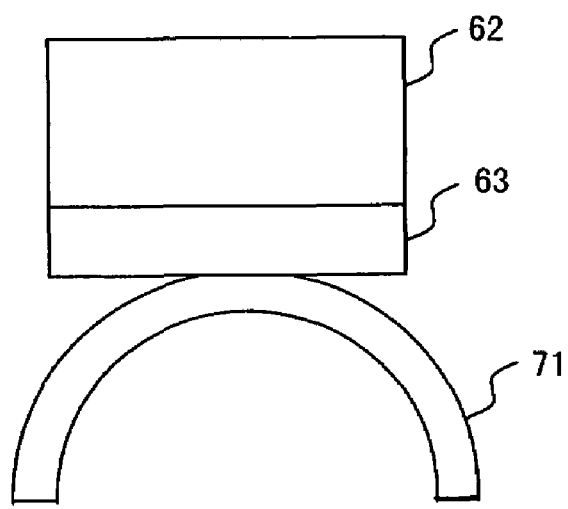
FIG. 10 is a transverse cross section view (No 1) from the right of FIG. 9.

FIG. 10 is a cross section viewed from the right of FIG. 9.

As shown by FIG. 10, the wedge 62 and the ultrasonic wave attenuation member 63 are mounted contacting on the pipe 71.

Due to the nature of a clamp-on type, the above described mounting is detachable afterwards in that the wedge 62 and ultrasonic wave attenuation member 63 are generally mounted onto the pipe 71 by being wrapped around using a steel belt, et cetera. The mounting can be done by fixing onto the pipe 71 with an adhesive for instance if no consideration is required for a removal later. Also, the ultrasonic wave attenuation member 63 can be fixed onto the wedge 62 with an adhesive.

The above described ultrasonic wave attenuation member 63 can be fabricated from a material, such as tungsten elastomer, having an acoustic impedance lower than the above described pipe 71.

Meanwhile, even if the wedge 62 is mounted onto the pipe 71 contacting it as indicated by FIG. 10, an ultrasonic wave emitted from the ultrasonic oscillator 61 actually keeps reflecting in the gap between the outer wall and inner wall of the pipe in a two dimensional spread.

Figure 11:
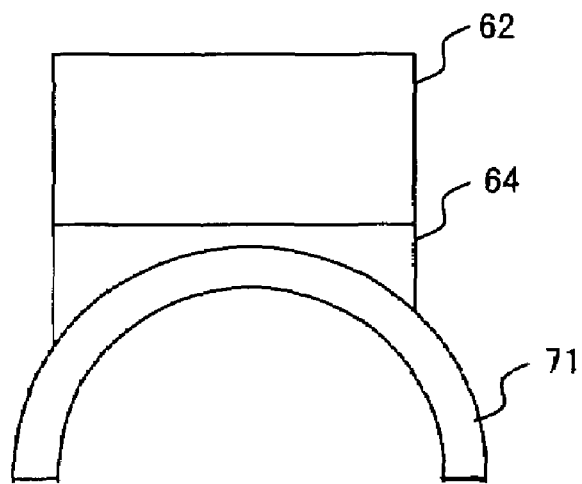
FIG. 11 is a transverse cross section view (No 2) from the right of FIG. 9.

In this context, installation of an ultrasonic wave attenuation member 64 being featured with a radius in contour of the outer wall of the pipe so as to include a position where such reflected wave having a two-dimensional spread first reaches the outer wall of the pipe 71 as indicated by FIG. 11 will make it possible to further attenuate the above described noise-adding echo signals, thereby greatly reducing acoustic noise.

Meanwhile, referring to FIGS. 9 through 11, use of ultrasonic wave transmission material having approximately the same acoustic impedance as the pipe material in place of an ultrasonic wave attenuation member, that is, a stainless steel member in a designed form being mounted on a stainless steel pipe for example, most of the ultrasonic wave gets transmitted through the aforementioned member at a position where an ultrasonic wave first reaches the outer wall of the pipe after being reflected from the inner wall thereof, although a little reflection occurs at the interface with the member. As a result of this, the wave transmitted through the outer wall is diffused by further reflections at the surface, et cetera, of the stainless steel member, thus enabling reduction of the noise-adding echo signals returning to the ultrasonic oscillator 61 and the resultant acoustic noise.

Figure 12:
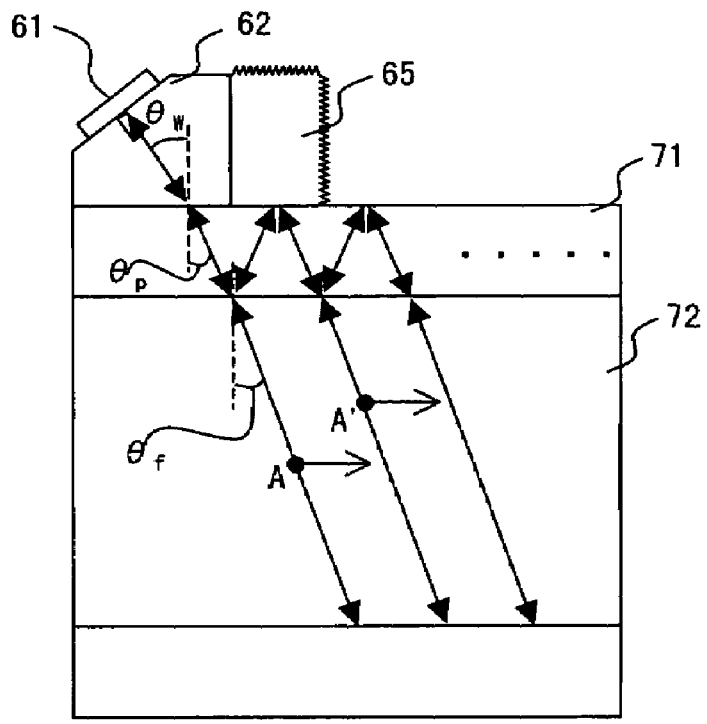
FIG. 12 shows a variation of the outer surface of a material in the case of using the material transmitting an ultrasonic wave.

Also in this case, an additional structure may be mounted on the outer surface of the ultrasonic wave transmission material for further diffusing the reflections so as to attenuate substantially the ultrasonic waves entering the ultrasonic wave transmission material by diffusion (i.e., a random reflection). Such a structure is exemplified in FIG. 12 in which a consideration may be given to the features of the surface of an ultrasonic wave transmission material 65 having a triangular shape with the same pitch or nearly the same pitch as the wave length of the injected ultrasonic wave.

Figure 13:
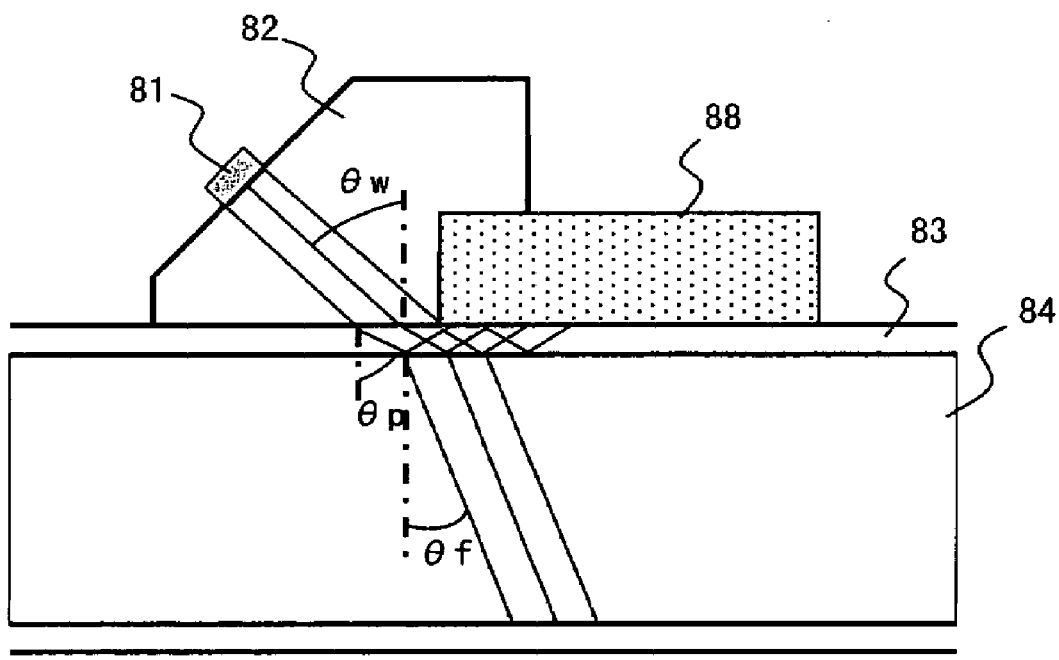
FIG. 13 shows a cross sectional view of a wedge unit for use in an ultrasonic flow meter of the second embodiment according to the present invention.

FIG. 13 shows a cross sectional view of a wedge unit for use in an ultrasonic flow meter of a second embodiment according to the present invention. The wedge unit comprises a wedge being equipped with an ultrasonic oscillator, and an ultrasonic wave attenuation member.

In FIG. 13, a wedge 82 and an ultrasonic wave attenuation member 88 are mounted on the outer wall of a pipe 83 in which a fluid 84 flows. One surface of the wedge 82 is mounted on a part of the outer circumference of the pipe 83. Another surface of the wedge 82 is equipped with an ultrasonic oscillator 81 which generates an ultrasonic wave in response to an electric signal supplied by a drive circuit (not shown), injects the ultrasonic wave into the fluid 84 and receives the reflected signal thereof. The received reflected signal is then supplied to a flow rate calculation unit (not shown) as an ultrasonic echo signal.

The wedge 82 is preferably constituted of a plastic resin material such as acrylic, polyvinyl chloride, et cetera, while the ultrasonic oscillator 81 is preferably constituted of a piezoelectric material such as PZT (lead zirconate titanate). The ultrasonic oscillator 81 is fixed onto the wedge 82 by an adhesive such as epoxy resin adhesive. Note that the surface of the wedge 82 on which the ultrasonic oscillator 81 is equipped (i.e., fixed) is inclined by θw degrees in reference to the vertical viewed from the longitudinal direction of the pipe 81 as shown by FIG. 13.

In the present embodiment, the diameter of the ultrasonic oscillator 81 is defined so that the projected size of the ultrasonic beam emitted by the ultrasonic oscillator 81 impressed on the outer wall of the pipe 83 dependent on an inclination angle of another surface of the wedge 82 being equipped by the ultrasonic oscillator 81 does not exceed the difference between a position where the ultrasonic wave is injected from the outer wall of the pipe and a position where the ultrasonic wave first reaches the outer wall of the pipe after being reflected by the inner wall thereof.

By the above described configuration, it is possible to avoid the multiplication of sidetracks as a result of ultrasonic waves overlapping with one another within the diameter of the ultrasonic oscillator 81 and eliminate error in the preferable ultrasonic echo as a result of it being accompanied by ultrasonic echo signals returning along the multiplied sidetracks.

Meanwhile, FIG. 13 shows a configuration further comprising an ultrasonic wave attenuation member 88, in which the ultrasonic wave attenuation member 88 is mounted on the outer circumference of the pipe 83 so as to avoid the above described projection incident on the outer wall of the pipe by the ultrasonic wave emitted from the ultrasonic oscillator 81, that is, the position where the ultrasonic wave first reaches the outer wall of the pipe. By this configuration, the ultrasonic wave enters the ultrasonic wave attenuation member 88 before reaching the outer wall of the pipe, thereby preventing further reflection.

Furthermore, an installation of the ultrasonic wave attenuation member 88 so as to include the position where the ultrasonic wave first reaches the outer wall of the pipe after being reflected by the inner wall of the pipe effectively reduces the amplitude of the initial reflected wave which would otherwise cause subsequent reflections, and thus is capable of further reducing the acoustic noise.

Note here that the ultrasonic wave attenuation member 88 is preferably of a size large enough to intercept more than one time of multiple reflections of an ultrasonic wave in consideration of the propagating direction of the ultrasonic wave. The ultrasonic wave attenuation member 88 is preferably constructed of a material having a smaller acoustic impedance than the pipe 83, such as tungsten elastomer. Meanwhile, the ultrasonic wave attenuation member 88 may be fixed onto the wedge 82 by using an adhesive for example, or directly fixed to the pipe by using a fixing unit such as a steel belt.

Figure 14:
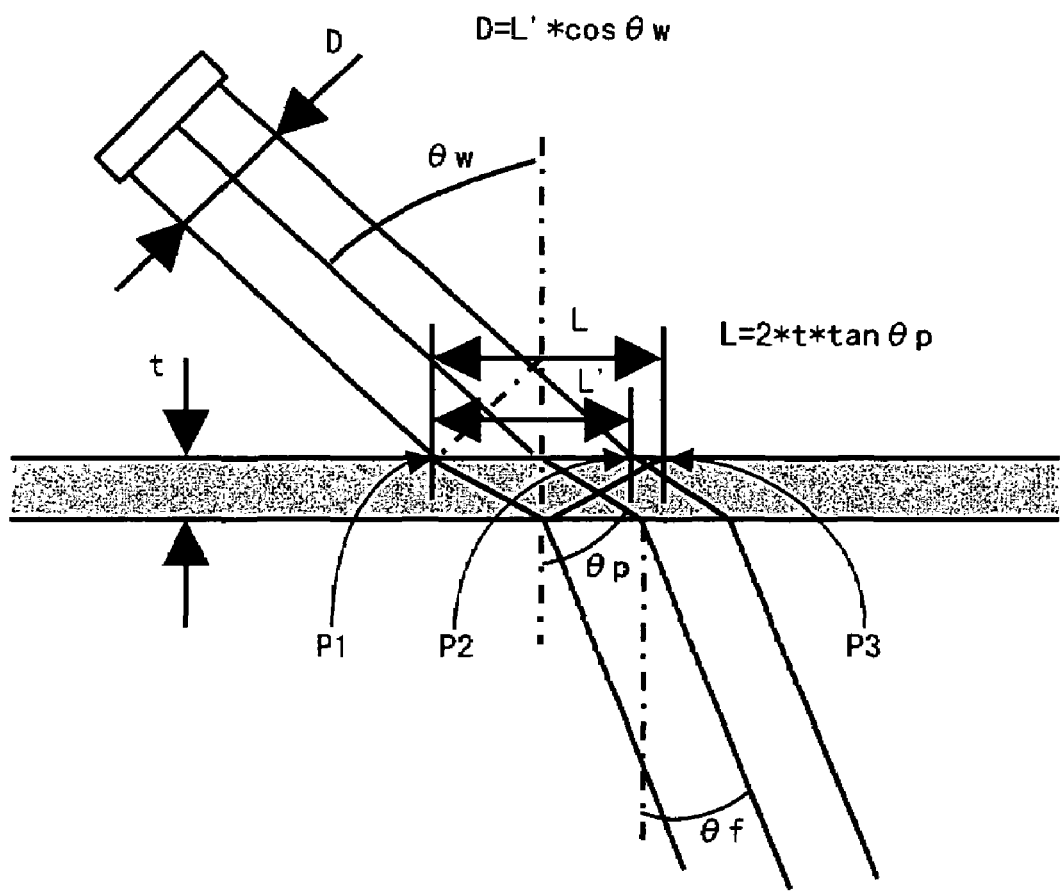
FIG. 14 shows how the diameter of an ultrasonic oscillator is determined.

FIG. 14 shows how the diameter of an ultrasonic oscillator is determined.

In FIG. 14, the diameter D of the ultrasonic oscillator is defined so that the projected size (i.e., the distance between the points P1 and P2, that is, L') of the ultrasonic beam emitted by the ultrasonic oscillator incident on the outer wall of the pipe, which depends on the inclination angle of another surface of the wedge being equipped by the ultrasonic oscillator, does not exceed the difference, L, between a position (i.e., the point P1) where the ultrasonic wave is injected from the outer wall of the pipe and another position (i.e., the point P3) where the ultrasonic wave first reaches the outer wall of the pipe after being reflected by the inner wall thereof. That is, the diameter D is determined in accordance with the following equation (A1):

$$L' \leq L \tag{A1}$$

Meanwhile, the following equation (A2) is derived, where θw is the angle of inclination for the surface of the wedge on which the ultrasonic oscillator is equipped:

$$D = L'^* \cos \theta w \tag{A2}$$

Meanwhile, the following equation (A3) is derived, where t is the thickness of the pipe wall, and θp is the angle showing the direction of propagation of the ultrasonic wave within the pipe:

$$L = 2t^* \tan \theta p \tag{A3}$$

Then the following equation (A4) is derived by substituting the equations (A2) and (A3) into (A1), replacing L and L':

$$(D/\cos \theta w) \leq 2t^* \tan \theta p \tag{A4}$$

Because θw ≤ π/2, rearranging the equation (A4) obtains the equation (A5):

$$D \leq 2t^* \tan \theta p^* \cos \theta w \tag{A5}$$

Determining the diameter D of an ultrasonic oscillator so that the projection size L' is equal to the difference L between the above described positions and the ultrasonic oscillator is realized by the maximum transmission power with an acceptable level of noise cut, thus deriving the following equation (A6):

$$D = 2t^* \tan \theta p^* \cos \theta w \tag{A6}$$

Figure 15:
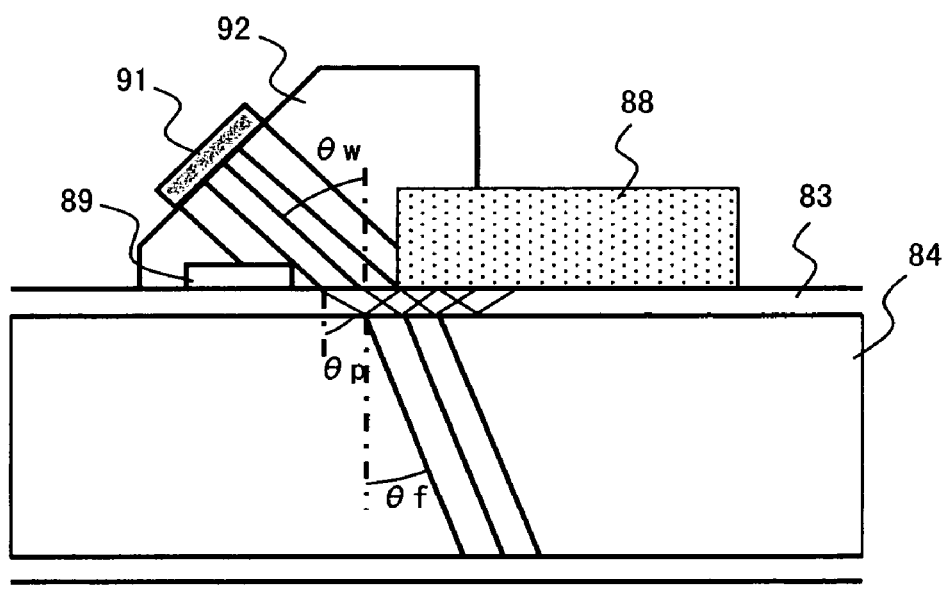
FIG. 15 shows a cross sectional view of a wedge unit for use in an ultrasonic flow meter of the third embodiment according to the present invention.

FIG. 15 shows a cross sectional view of a wedge unit for use in an ultrasonic flow meter of the third embodiment according to the present invention. The wedge unit comprises a wedge being equipped by an ultrasonic oscillator, and an ultrasonic wave attenuation member. Descriptions will be omitted from the description of FIG. 15 where there is duplication with FIG. 13.

In FIG. 15, mounted on the bottom of a wedge 92 are a slit 89 for limiting the diameter of the ultrasonic beam emitted by an ultrasonic oscillator 91 and an ultrasonic wave attenuation member 88 for attenuating an ultrasonic wave component adding noise to an ultrasonic echo signal. Note that in the case an emitted ultrasonic wave is to be injected into the ultrasonic wave attenuation member 88 before reaching the outer wall of pipe, the ultrasonic wave attenuation member 88 doubles as a slit for limiting the beam diameter of the ultrasonic wave.

The slit 89 is constituted of a material having a smaller acoustic impedance than the wedge material, such as air or some other gaseous body, or a material absorbing or attenuating ultrasonic waves (such as tungsten elastomer), or an ultrasonic wave reflection member (e.g., a metallic material such as stainless steel or aluminum) made of a material having a larger acoustic impedance compared to the wedge material.

By the above described method, it is possible to reduce the rate of sidetrack multiplication due to overlap between ultrasonic waves within the limited beam diameter, corresponding to a combination of the slit 89 and the ultrasonic wave attenuation member 88, and error caused by the preferable ultrasonic echo signal being overlapped with ultrasonic echo signals received by way of the multiplied sidetracks.

Meanwhile, the slit 89 or the ultrasonic wave attenuation member 88 is preferably mounted so that the projected size of the beam incident on the outer wall of the pipe 83 does not exceed the difference between a position where any of the beam is injected from the outer wall of the pipe and a point where the beam first reaches the outer wall of the pipe after being reflected by the inner wall of the pipe.

This prevents overlapping between the ultrasonic beams within the above described beam diameter, adding further effectiveness.

In the meantime, the slit 89 or the ultrasonic wave attenuation member 88 is preferably mounted on the bottom of the wedge in the third embodiment so as to limit the beam diameter D of the ultrasonic beam emitted by the ultrasonic oscillator 91 by satisfying the conditional equation (i.e., $D \leq 2t^* \tan \theta p^* \cos \theta w$), where t is the thickness of the pipe 83, and $\theta p$ is the angle of propagation of the ultrasonic wave within the pipe and $\theta w$ is the inclination angle of the wedge.

Figure 16:
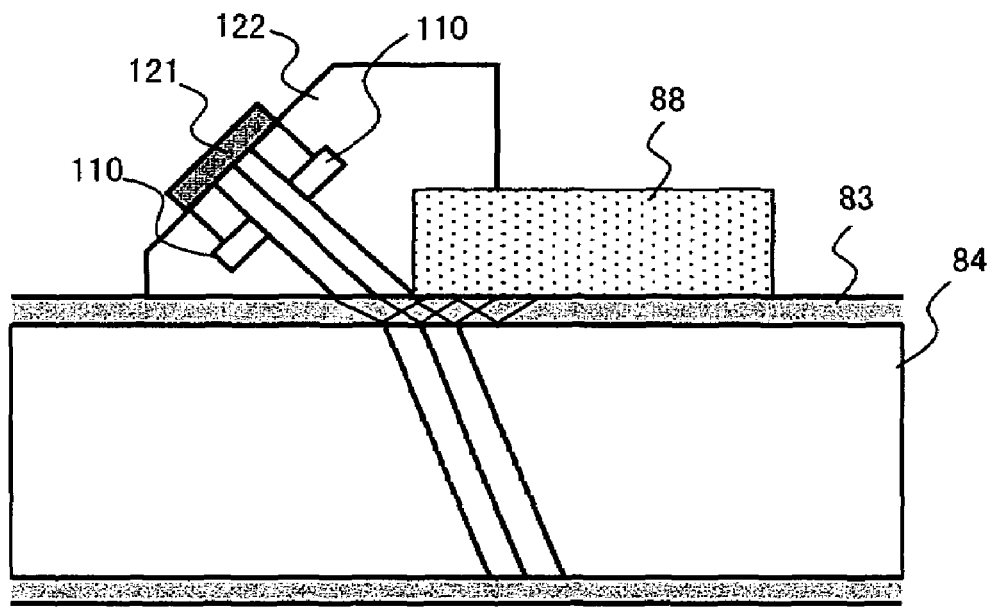
FIG. 16 shows a cross sectional view of a wedge for use in an ultrasonic flow meter of the fourth embodiment according to the present invention.

FIG. 16 shows a cross sectional view of a wedge for use in an ultrasonic flow meter of a fourth embodiment according to the present invention. The wedge is equipped with an ultrasonic oscillator and featured with a slit therein. In describing FIG. 16, where common with FIG. 13 descriptions are omitted.

In FIG. 16, inside a wedge 122 there is a slit 110 for limiting the beam diameter of the ultrasonic beam emitted from an ultrasonic oscillator 121.

The slit 110 is constituted either of a material having a smaller acoustic impedance than the wedge material, such as air or some other gaseous body, a material absorbing or attenuating ultrasonic waves (such as tungsten elastomer), or an ultrasonic wave reflection member (e.g., a metallic material such as stainless steel or aluminum) made of a material having a larger acoustic impedance than the wedge material.

By the above described configuration, it is possible to reduce the rate of sidetrack multiplication due to overlapping ultrasonic waves with one another, responding to an extension of the slit 110 limiting the beam diameter, and error caused by the required ultrasonic echo signal being overlapped by ultrasonic echo signals received by way of multiplied sidetracks.

The ultrasonic wave attenuation member 88 is preferably mounted on the outer circumference of the pipe 83 so as to avoid a position where an ultrasonic wave emitted by the ultrasonic oscillator 121 first reaches the outer wall of the pipe 83.

Meanwhile, the slit 110 limits the beam diameter of the ultrasonic oscillator 121 so that size of the projected beam diameter incident on the outer wall of the pipe does not exceed the difference between a position where any of the beam enters the outer wall of the pipe and a position where the beam first reaches the outer wall of the pipe after being reflected by the inner wall thereof.

This prevents overlapping between the ultrasonic waves within the above described beam diameter, adding further effectiveness.

Further, the ultrasonic wave enters the ultrasonic wave attenuation member 88 before reaching the outer wall of the pipe, thereby preventing further reflection.

And furthermore, an installation of the ultrasonic wave attenuation member 88 so as to include the position where the ultrasonic wave first reaches the outer wall of the pipe 83 after being reflected by the inner wall of the pipe effectively reduces the strength of the initial reflection wave which would otherwise cause subsequent reflections.

In the meantime, the slit 110 is preferably mounted inside the wedge in the fourth embodiment so as to limit the beam diameter D of ultrasonic wave emitted from the ultrasonic oscillator 121 by satisfying the conditional equation (i.e., $D \leq 2t^* \tan \theta p^* \cos \theta w$), where t is the thickness of the pipe 83, and $\theta p$ is the angle of propagation of the ultrasonic wave within the pipe and $\theta w$ is the inclination angle of the wedge.

Meanwhile, in the above description, while the ultrasonic wave attenuation member 88 is installed in the propagating direction of the ultrasonic wave as shown by FIGS. 13 and 16, the ultrasonic wave attenuation member 88 may be replaced by an ultrasonic wave transmission member having the same or approximately the same acoustic impedance as the pipe material. In such case, the interface between the ultrasonic wave transmission member and the air will preferably be rugged so as to diffuse the ultrasonic wave reaching thereto.

Figure 17:
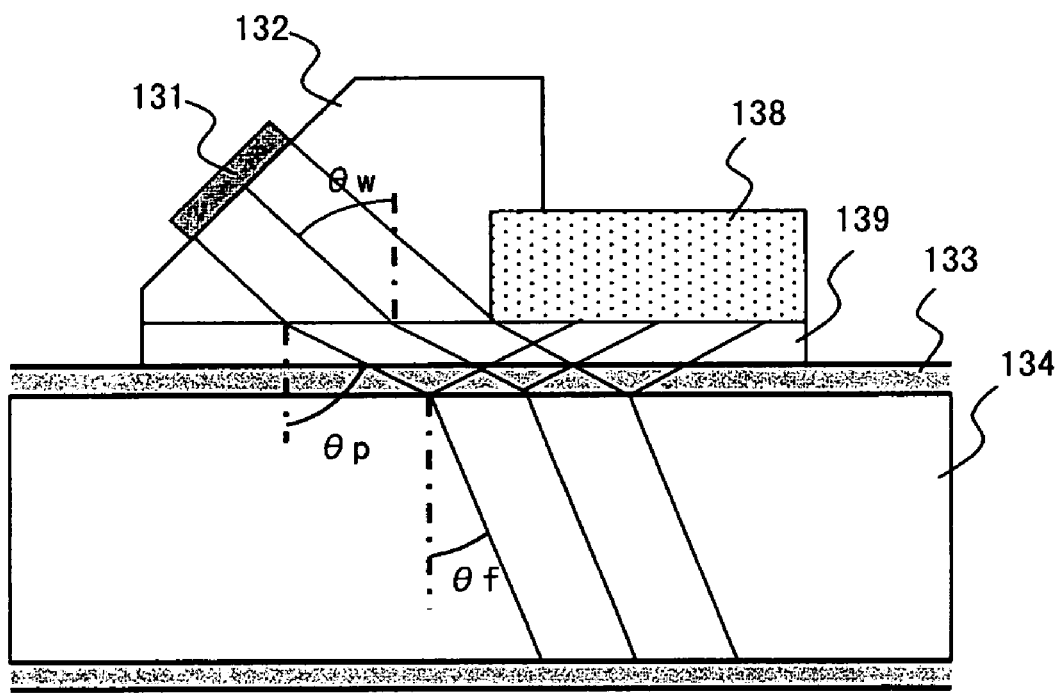
FIG. 17 shows a cross sectional view of a wedge unit for use in an ultrasonic flow meter of the fifth embodiment according to the present invention.

FIG. 17 shows a cross sectional view of a wedge unit for use in an ultrasonic flow meter of a fifth embodiment according to the present invention. The wedge unit comprises a wedge 132 being equipped with an ultrasonic oscillator 131, and an ultrasonic attenuation member 138.

In FIG. 17, a spacer 139 is mounted between the wedge 132 and the pipe 133 in which a fluid 134 flows, and the wedge 132 is mounted on a part of the outer circumference of the pipe 133 by way of the spacer 139 which is extended in the propagating direction of the ultrasonic wave. The extended part of the spacer 139 is mounted by an ultrasonic wave attenuation member 138 for attenuating an ultrasonic wave component adding noise to the preferable ultrasonic echo signal.

Meanwhile, another surface of the wedge 132 is equipped by an ultrasonic oscillator 131 which generates an ultrasonic wave in response to an electric signal from a drive circuit (not shown), injects the ultrasonic wave into a fluid 134 in a pipe 133 and receives the reflected wave. The received reflected wave is then supplied to a flow rate calculation unit (not shown) as an ultrasonic echo signal.

The wedge 132 is preferably composed of a plastic resin material such as acrylic, polyvinyl chloride, et cetera, while the ultrasonic oscillator 131 is preferably composed of a piezoelectric material such as PZT (lead zirconate titanate). The ultrasonic oscillator 131 is fixed to the wedge 132 by an adhesive such as epoxy resin adhesive. Note that the surface of the wedge 132 on which the ultrasonic oscillator 131 is equipped (i.e., fixed) is inclined by θw degrees in reference to the vertical viewed from the longitudinal direction of the pipe 133 as shown by FIG. 13.

Here, it is possible to reduce the rate of sidetrack multiplication due to ultrasonic waves overlapping with one another within the diameter of the ultrasonic oscillator 131, by the spacer 139 installed between the wedge 132 and the outer wall of the pipe, and an error caused by the preferable ultrasonic echo signal being overlapped with ultrasonic echo signals received by way of the multiple sidetracks.

Furthermore, in the present embodiment, the thickness of the spacer 139 is adjusted so that the size of the projection of the ultrasonic beam emitted by the ultrasonic oscillator 131, which is defined by the inclination angle of the surface of the wedge 132 to which the ultrasonic oscillator 131 is attached, impressed on the contact surface of the spacer 139 with the wedge 132, does not exceed the difference between a position where the ultrasonic wave enters from the contact surface and a position where the ultrasonic wave first reaches the contact surface after being reflected by the inner wall of the pipe.

By this configuration, it is possible to avoid a multiplication of sidetracks within the diameter of the ultrasonic oscillator 131, and error caused by the preferable ultrasonic echo signal being overlapped with ultrasonic echo signals received by way of the multiple sidetracks.

Meanwhile, the ultrasonic wave attenuation member 138 is mounted on the outer wall of the pipe in FIG. 17, making it possible to reduce the influence of multiple reflections between the inner and outer walls of the pipe.

Installing the ultrasonic wave attenuation member 138 on the outer circumference of the pipe 133 so as to avoid a projection of an ultrasonic wave emitted by the ultrasonic oscillator 131 impressed on the contact surface of the spacer 139 with the wedge 132, that is, the position where the ultrasonic wave first reaches the contact surface of the spacer 139, will prevent a reflection because the ultrasonic wave enters the ultrasonic wave attenuation member 138 before reaching the outer wall of the pipe.

Furthermore, installation of the ultrasonic wave attenuation member 138 on the spacer 139 so as to include the position where the ultrasonic wave first reaches the contact surface of the spacer 138 (also including an extended position contacting the wedge 132) after being reflected by the inner wall of the pipe will be capable of effectively reducing the strength of the initial reflected wave which would otherwise cause subsequent reflections, and thus reduces the acoustic noise substantially.

Meanwhile, the ultrasonic wave attenuation member 138 is preferably large enough to intercept multiple reflections of the ultrasonic wave in the pipe at least once, considering the propagating direction of ultrasonic wave in the pipe. Also, the ultrasonic wave attenuation member 138 is preferably configured by a material having a smaller acoustic impedance compared to the pipe 133, such as tungsten elastomer. Meanwhile, the ultrasonic wave attenuation member 138 may be fixed onto the wedge 132 by using an adhesive for example, or directly fixed to the pipe by using a fixing unit such as a steel belt.

Figure 18:
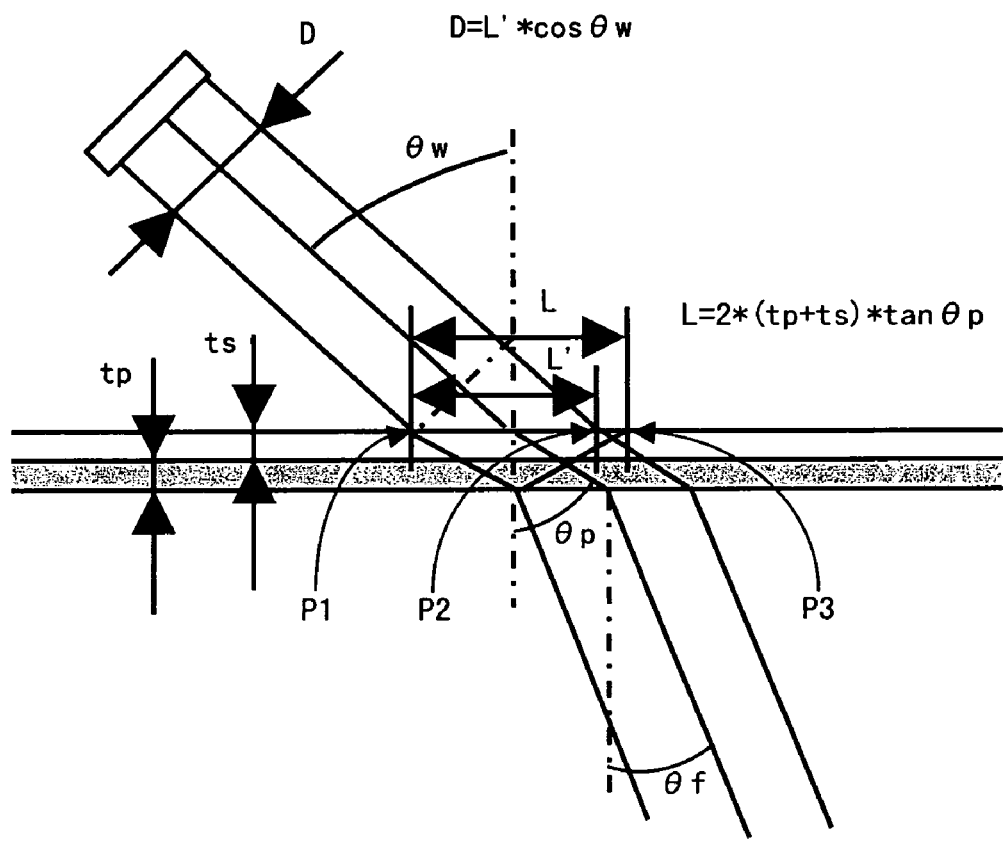
FIG. 18 shows how the thickness of a spacer is determined.

FIG. 18 shows how the thickness of the spacer is determined.

In FIG. 18, the thickness of the spacer 139 is adjusted so that the size of the projection (the distance between points P1 and P2, that is L') of an ultrasonic beam emitted by the ultrasonic oscillator 131, which is dependent on the inclination angle of the surface of the wedge 132 being equipped by the ultrasonic oscillator 131, impressed on the contact surface of the spacer 139 with the wedge 132 does not exceed the difference, L, between a position (the point P1) where the ultrasonic wave enters from the contact surface and another position (the point P3) where the ultrasonic wave first reaches the contact surface after being reflected by the inner wall of the pipe. That is, the thickness of the spacer 139 is determined in accordance with the following equation (B1):

$$L' \leq L \tag{B1}$$

Meanwhile, the following equation (B2) is derived, where θw is the angle of inclination of the surface of the wedge on which the ultrasonic oscillator is equipped:

$$D = L'^* \cos θw \tag{B2}$$

Note that the spacer is composed of a material which is assumed to have the same or approximately the same acoustic impedance as the pipe wall, to simplify the equations, et cetera, in the following. However, a similar argument applies if such a limitation is not imposed.

Meanwhile, the following equation (B3) is derived, where tp is the thickness of pipe, ts is the thickness of spacer and θp is the direction of the ultrasonic wave propagation (B3):

$$L = 2^*(tp+ts)^* \tan θp \tag{B3}$$

Then the following equation (B4) is obtained when replacing L and L' by substituting the equations (B2) and (B3) for (B1):

$$(D/\cos θw) \leq 2^*(tp+ts)^* \tan θp \tag{B4}$$

Since $0 \leq θp$ and $θw \leq π/2$, rearranging equation (B4) will obtain (B5):

$$D/(2^* \tan θp^* \cos θw) - tp \leq ts \tag{B5}$$

The thickness ts of the spacer which makes the projected width L equals to the difference L' between the above described positions, gives the minimum thickness of the spacer capable of efficiently cutting noise. In this case, the following equation (B6) holds:

$$D/(2^* \tan θp^* \cos θw) - tp = ts \tag{B6}$$

Note that, while the ultrasonic wave attenuation member 138 is mounted in the direction of ultrasonic wave propagation as shown by FIG. 17 in the above description, an ultrasonic wave transmission member having the same or approximately the same acoustic impedance as the pipe material may be substituted for the ultrasonic wave attenuation member 138. In such a case, the interface of the ultrasonic wave transmission member and the air is preferably be rugged so as to diffuse the ultrasonic waves reaching thereto.

APPLICABILITY TO INDUSTRIES

The wedge and the wedge unit according to the present invention are applicable to a Doppler-method clamp-on type ultrasonic flow meter for use by mounting on (i.e., clamping on) a part of the outer circumference of a pipe.

What is claimed is:

1. A wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprising:
   a wedge with one surface thereof being mounted on a part of the outer circumference of the pipe and on another surface thereof being equipped with an ultrasonic oscillator that generates the ultrasonic wave in response to an electric signal and receives the reflected wave; and
   an ultrasonic wave attenuation unit being mounted on the outer circumference of the pipe;
   wherein the ultrasonic wave attenuation unit is configured to be in contact with a position where an ultrasonic wave injected by the ultrasonic oscillator into the pipe by way of the wedge first reaches the outer wall of the pipe after being reflected by the inner wall of the pipe.

2. The wedge unit according to claim 1, wherein said ultrasonic wave attenuation unit is composed of a material having a smaller acoustic impedance compared to the material of said pipe.

3. The wedge unit according to claim 1, wherein said ultrasonic wave attenuation unit is composed of tungsten elastomer.

4. The wedge unit according to claim 1, wherein a part of said ultrasonic wave attenuation unit contacting with said pipe is featured with the same radius as said pipe.

5. A wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprising:
   a wedge with one surface thereof being mounted on a part of the outer circumference of the pipe and on another surface thereof being equipped with an ultrasonic oscillator that generates the ultrasonic wave in response to an electric signal and receives the reflected wave; and
   an ultrasonic wave transmission unit having an acoustic impedance approximately the same as the pipe and being mounted on the outer circumference of the pipe;
   wherein the ultrasonic wave transmission unit is configured to be in contact with a position where an ultrasonic wave injected from the ultrasonic oscillator into the pipe by way of the wedge first reaches the outer wall of the pipe after being reflected by the inner wall of the pipe.

6. The wedge unit according to claim 5, wherein a part of said ultrasonic transmission unit contacting with said pipe is featured with the same radius as said pipe.

7. The wedge unit according to claim 5, wherein said ultrasonic wave transmission unit is configured by a feature on the outer surfaces thereof for causing an ultrasonic wave to be diffused.

8. A wedge used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, wherein
   one surface is mounted on a part of the outer circumference of the pipe and another surface is equipped with an ultrasonic oscillator that generates the ultrasonic wave in response to an electric signal and receives the reflected wave, and
   the diameter of the ultrasonic oscillator is defined so that the projected size of the ultrasonic beam emitted by the ultrasonic oscillator impressed on the outer wall of the pipe, which is dependent on the inclination angle of another surface of the wedge being mounted by the ultrasonic oscillator, does not exceed the difference between a position where the ultrasonic wave is injected from the outer wall of the pipe and a position where the ultrasonic wave first reaches the outer wall of the pipe after being reflected by the inner wall thereof.

9. The wedge according to claim 8, wherein the diameter of said ultrasonic oscillator is defined so that said projected size is equal, or approximately equal, to said difference.

10. The wedge according to claim 8, wherein the diameter, D, of said ultrasonic oscillator is defined so as to satisfy the following conditional equation, where t is the thickness of said pipe, $\theta p$ is a propagation angle of ultrasonic wave in a pipe and $\theta w$ is an inclination angle of wedge:

$$D \leq 2t^* \tan \theta p^* \cos \theta w$$

11. The wedge according to claim 8, wherein the diameter, D, of said ultrasonic oscillator is defined so as to satisfy, or satisfy approximately, the following equation, where t is the thickness of said pipe, $\theta p$ is a propagation angle of ultrasonic wave in a pipe and $\theta w$ is an inclination angle of wedge:

$$D = 2t^* \tan \theta p^* \cos \theta w$$

12. A wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprising:
   a wedge with one surface thereof being mounted on a part of the outer circumference of the pipe and on another surface thereof being equipped with an ultrasonic oscillator that generates the ultrasonic wave by using an electric signal and receives the reflected wave; and
   an ultrasonic wave attenuation member for attenuating an ultrasonic wave component adding a noise to an ultrasonic echo signal, wherein
   the diameter of the ultrasonic oscillator is defined so that the projected size of the ultrasonic beam emitted by the ultrasonic oscillator impressed on the outer wall of the pipe, depending on the inclination angle of another surface of the wedge being equipped by the ultrasonic oscillator does not exceed the difference between a position where the ultrasonic wave is injected from the outer wall of the pipe and a position where the ultrasonic wave first reaches at the outer wall of the pipe after being reflected by the inner wall thereof, and
   an ultrasonic wave attenuation member is mounted on the outer circumference of the pipe so as to avoid the projection of an ultrasonic beam by the ultrasonic oscillator.

13. The wedge unit according to claim 12, wherein said ultrasonic wave attenuation member is mounted on the outer circumference of said pipe so as to further include a position where an ultrasonic wave from the ultrasonic oscillator first reaches the outer wall of the pipe after being reflected by the inner wall thereof.

14. The wedge unit according to claim 12, wherein the diameter of said ultrasonic oscillator is defined so that said projected size is equal, or approximately equal, to said difference.

15. The wedge unit according to claim 12, wherein the acoustic impedance of said ultrasonic wave attenuation member is smaller than that of said pipe.

16. The wedge unit according to claim 12, wherein said ultrasonic wave attenuation member is made of tungsten elastomer.

17. A wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprising:
- a wedge with one surface thereof being mounted on a part of the outer circumference of the pipe and on another surface thereof being equipped with an ultrasonic oscillator that generates the ultrasonic wave in response to an electric signal and receives the reflected wave; and
- first and second beam diameter limitation units for limiting an ultrasonic beam diameter emitted by the ultrasonic oscillator and being mounted on the bottom surface of the wedge, wherein
- at least one of the first and second beam diameter limitation units doubles as an ultrasonic wave attenuation member for attenuating an ultrasonic wave component adding noise to an ultrasonic echo signal.

18. The wedge unit according to claim 17, wherein said beam diameter limitation unit or said ultrasonic wave attenuation member is mounted for limiting a beam diameter so that the projected size of the beam impressed on the outer wall of the pipe does not exceed the difference between a position where any of the beam element (the ultrasonic wave) is injected from the outer wall of pipe and a position where the beam element first reaches the outer wall of the pipe after being reflected by the inner wall thereof.

19. The wedge according to claim 18, wherein said beam diameter limitation unit or said ultrasonic wave attenuation member is mounted for limiting the diameter, D, of said ultrasonic oscillator so as to satisfy the following conditional equation, where t is the thickness of a pipe, $\theta p$ is a propagation angle of ultrasonic wave in the pipe and $\theta w$ is an inclination angle of wedge:

$$D \leq 2t^* \tan \theta p^* \cos \theta w$$

20. The wedge according to claim 17, wherein said beam diameter limitation unit has a smaller acoustic impedance than the wedge material and is a slit which is composed of a gaseous body such as air.

21. The wedge according to claim 17, wherein said beam diameter limitation unit is a slit being composed of a material for absorbing and/or attenuating an ultrasonic wave.

22. The wedge according to claim 21, wherein said material for absorbing and/or attenuating an ultrasonic wave is tungsten elastomer.

23. The wedge according to claim 17, wherein said beam diameter limitation unit is an ultrasonic wave reflection member being composed of a material having larger acoustic impedance than the wedge material.

24. The wedge according to claim 23, wherein said ultrasonic wave reflection member is made of a metallic material such as stainless steel or aluminum.

25. A wedge used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, wherein
- the wedge on one surface thereof is mounted on a part of the outer circumference of the pipe and on another surface thereof is equipped with an ultrasonic oscillator for generating the ultrasonic wave in response to an electric signal and receiving the reflected signal, and is equipped by a beam diameter limitation unit for limiting the ultrasonic beam diameter emitted from the ultrasonic oscillator inside the wedge.

26. The wedge according to claim 25, wherein said beam diameter limitation unit is mounted inside the wedge so that the projected size of said limited beam diameter impressed on the outer wall of the pipe does not exceed the difference between a position where any of the beam element (the ultrasonic wave) is injected from the outer wall of pipe and a position where the beam element first reaches the outer wall of the pipe after being reflected by the inner wall thereof.

27. A wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprising:
- a wedge with one surface thereof being mounted on a part of the outer circumference of the pipe and on another surface thereof being equipped with an ultrasonic oscillator that generates the ultrasonic wave in response to an electric signal and receives the reflected wave, and additionally inside thereof being equipped by a beam diameter limitation unit for limiting an ultrasonic wave beam diameter emitted by the ultrasonic oscillator; and
- an ultrasonic wave attenuation member for attenuating an ultrasonic wave component adding noise to an ultrasonic echo signal.

28. The wedge unit according to claim 27, wherein said beam diameter limitation unit is mounted inside the wedge so that the projected size of said limited beam diameter impressed on the outer wall of a pipe does not exceed the difference between a position where any of the beam is injected from the outer wall of the pipe and a position where the beam first reaches at the outer wall of the pipe after being reflected by the inner wall thereof.

29. The wedge unit according to claim 27, wherein said ultrasonic wave attenuation member is mounted on the outer circumference of said pipe so as to avoid a position where an ultrasonic wave emitted from said ultrasonic oscillator first reaches the outer wall of the pipe.

30. The wedge unit according to claim 27, wherein said ultrasonic wave attenuation member is further mounted on the outer circumference of said pipe so as to include a position where an ultrasonic beam reaches the outer wall of the pipe after being reflected by the inner wall thereof.

31. The wedge unit according to claim 27, wherein said beam diameter limitation unit is mounted inside the wedge for limiting the diameter, D, of said ultrasonic beam so as to satisfy the following conditional equation, where t is a thickness of a pipe, $\theta p$ is a propagation angle of ultrasonic wave in the pipe and $\theta w$ is an inclination angle of the wedge:

$$D \leq 2t^* \tan \theta p^* \cos \theta w$$

32. The wedge unit according to claim 27, wherein said beam diameter limitation unit has a smaller acoustic impedance than the wedge material and is a slit which is configured by a gaseous body such as air.

33. The wedge unit according to claim 27, wherein said beam diameter limitation unit is a slit being configured by a material for absorbing and/or attenuating an ultrasonic wave.

34. The wedge unit according to claim 33, wherein said material for absorbing and/or attenuating an ultrasonic wave is tungsten elastomer.

35. The wedge unit according to claim 27, wherein said beam diameter limitation unit is an ultrasonic wave reflection member being configured by a material having larger acoustic impedance than the wedge material.

36. The wedge unit according to claim 35, wherein said ultrasonic wave reflection member is made of a metallic material such as stainless steel or aluminum.

37. A wedge unit used for an ultrasonic Doppler flow meter, being mounted on the outer wall of a pipe in which a fluid flows, supplying an ultrasonic wave to the fluid, receives the reflected wave and supplies the reflected wave to a flow rate calculation unit, comprising:
a wedge with one surface thereof being mounted on a part of the outer circumference of the pipe and on another surface thereof being equipped with an ultrasonic oscillator that generates the ultrasonic wave in response to an electric signal and receives the reflected wave; and
a spacer being installed between the wedge and the pipe.

38. The wedge unit according to claim 37, wherein the thickness of said spacer is defined so that a size of the projection of the ultrasonic beam, which is dependent on the inclination angle of another surface of said wedge being equipped by said ultrasonic oscillator, impressed on a contact surface of the spacer, does not exceed the difference between a position where the ultrasonic wave enters from the contact surface and a position where the ultrasonic wave first reaches the contact surface after being reflected by the inner wall of said pipe.

39. The wedge unit according to claim 38, wherein the thickness of said spacer is defined so that said projected size is equal, or approximately equal, to said difference.

40. The wedge unit according to claim 37, wherein said spacer is constituted of a material having the same, or approximately the same, acoustic impedance as the pipe material.

41. The wedge unit according to claim 40, wherein said spacer thickness is defined so as to satisfy the following conditional equation, where tp is the thickness of said pipe, ts is the thickness of said spacer, θp is the propagation angle of the ultrasonic wave in the pipe or spacer, θw is the inclination angle of wedge and D is the diameter of the ultrasonic oscillator:

$$D/(2*\tan θp*\cos θw)-tp \leq ts$$

42. The wedge unit according to claim 40, wherein said spacer thickness is defined so as to satisfy, or approximately satisfy, the following conditional equation, where tp is the thickness of said pipe, ts is the thickness of said spacer, θp is the propagation angle of ultrasonic wave in the pipe or spacer, θw is the inclination angle of wedge and D is the diameter of the ultrasonic oscillator:

$$D/(2*\tan θp*\cos θw)-tp=ts$$

43. The wedge unit according to claim 37, wherein said spacer is extended in the propagating direction of said ultrasonic wave,
an ultrasonic wave attenuation member is further comprised for attenuating an ultrasonic wave component adding noise to an ultrasonic echo signal, and
the ultrasonic wave attenuation member is mounted onto the spacer.

44. The wedge unit according to claim 43, wherein said ultrasonic wave attenuation member is mounted on said spacer so as to avoid a projection, which is dependent on the inclination angle of another surface of the wedge being equipped by said ultrasonic oscillator, impressed on a contact surface of the spacer with the wedge by an ultrasonic wave emitted from the ultrasonic oscillator.

45. The wedge unit according to claim 44, wherein an ultrasonic wave attenuation member is mounted on said spacer so as to include a position where an ultrasonic wave first reaches the contact surface of said spacer after being reflected by the inner wall of pipe.

46. The wedge unit according to claim 43, wherein said ultrasonic wave attenuation member has a smaller acoustic impedance than the pipe material.

47. The wedge unit in claim 43, wherein said ultrasonic wave attenuation member is tungsten elastomer.

48. The wedge unit in claim 43, wherein said ultrasonic wave attenuation member is composed of a material having the same or approximately the same impedance as the pipe material and also features corrugated surfaces where being exposed to the air.

* * * * *